United States Patent
Singh et al.

(10) Patent No.: US 9,467,329 B2
(45) Date of Patent: Oct. 11, 2016

(54) COORDINATING ACTIVITY VIEWS ACROSS OPERATING SYSTEM DOMAINS

(71) Applicants: BlackBerry Limited, Waterloo (CA); 2236008 Ontario Inc., Waterloo (CA)

(72) Inventors: Ravi Singh, Toronto (CA); Daniel Jonas Major, Ottawa (CA); Kevin Dennis Goodman, Nepean (CA); Sivakumar Nagarajan, Ottawa (CA)

(73) Assignees: BlackBerry Limited, Waterloo, Ontario; 2236008 Ontario Inc., Waterloo, Ontario ( * ) Notice: Subject to any disclaimer, the term of this patent is extended or adjusted under 35 U.S.C. 154(b) by 170 days.

(21) Appl. No.: 14/290,114

(22) Filed: May 29, 2014

(65) Prior Publication Data

US 2015/0350005 A1 Dec. 3, 2015

(51) Int. Cl.
| | | |
|---|---|---|
| H04L 12/24 | (2006.01) | |
| H04L 29/08 | (2006.01) | |
| G06F 9/44 | (2006.01) | |
| G06F 9/455 | (2006.01) | |
| G06F 3/048 | (2013.01) | |

(52) U.S. Cl.
CPC .............. *H04L 41/026* (2013.01); *G06F 3/048* (2013.01); *G06F 9/4443* (2013.01); *G06F 9/45533* (2013.01); *H04L 41/042* (2013.01); *H04L 67/143* (2013.01)

(58) Field of Classification Search
None
See application file for complete search history.

(56) References Cited

U.S. PATENT DOCUMENTS

| 6,883,098 | B1 * | 4/2005 | Roman ................... G06F 21/53 713/150 |
| 8,650,303 | B1 * | 2/2014 | Lang ....................... G06F 21/51 709/226 |
| 8,849,979 | B1 * | 9/2014 | Qureshi .............. H04L 12/2856 709/220 |
| 8,935,392 | B2 * | 1/2015 | Samdadiya ......... G06F 11/3006 709/203 |
| 9,189,753 | B2 * | 11/2015 | Morley .................. G06Q 10/00 |
| 2005/0055578 | A1 * | 3/2005 | Wright .................... G06F 21/32 726/4 |
| 2007/0174429 | A1 * | 7/2007 | Mazzaferri ........... G06F 3/1415 709/218 |
| 2010/0037243 | A1 | 2/2010 | Mo et al. |
| 2012/0084792 | A1 | 4/2012 | Benedek et al. |
| 2013/0117742 | A1 | 5/2013 | Newell |
| 2013/0298201 | A1 * | 11/2013 | Aravindakshan ... H04L 63/0272 726/4 |
| 2014/0033271 | A1 * | 1/2014 | Barton .................... H04L 67/10 726/1 |
| 2014/0053234 | A1 * | 2/2014 | Barton .................... H04L 67/10 726/1 |
| 2014/0297839 | A1 * | 10/2014 | Qureshi ............. H04L 12/2856 709/224 |

OTHER PUBLICATIONS

Android Developers; "Tasks and Back Stack"; http://developer.android.com/guide/topics/ui/index.html; Jun. 25, 2012; 9 pages.
European Extended Search Report; Application No. 15169926.1; Dec. 7, 2015; 8 pages.
Canadian Office Action; Application No. 2,893,097; Jun. 15, 2016; 4 pages.

* cited by examiner

*Primary Examiner* — Ranodhi Serrao
(74) *Attorney, Agent, or Firm* — Conley Rose, P.C.; J. Robert Brown, Jr.

(57) ABSTRACT

A device and its operations are described herein. In some examples, the operations can include executing a first application within a first operating system domain of a device, the first application associated with at least a first activity view. The operations can further include detecting user input associated with the first application. The user input is associated with activating a second activity view of a second application. The operations can further include determining that the second application corresponds to a second operating system domain of the device. The operations can further include establishing a first proxy link within the first operating system domain that corresponds with a second proxy link within the second operating system domain. The first proxy link is associated with causing the second proxy link to invoke the second activity view of the second application within the second operating system domain.

30 Claims, 18 Drawing Sheets

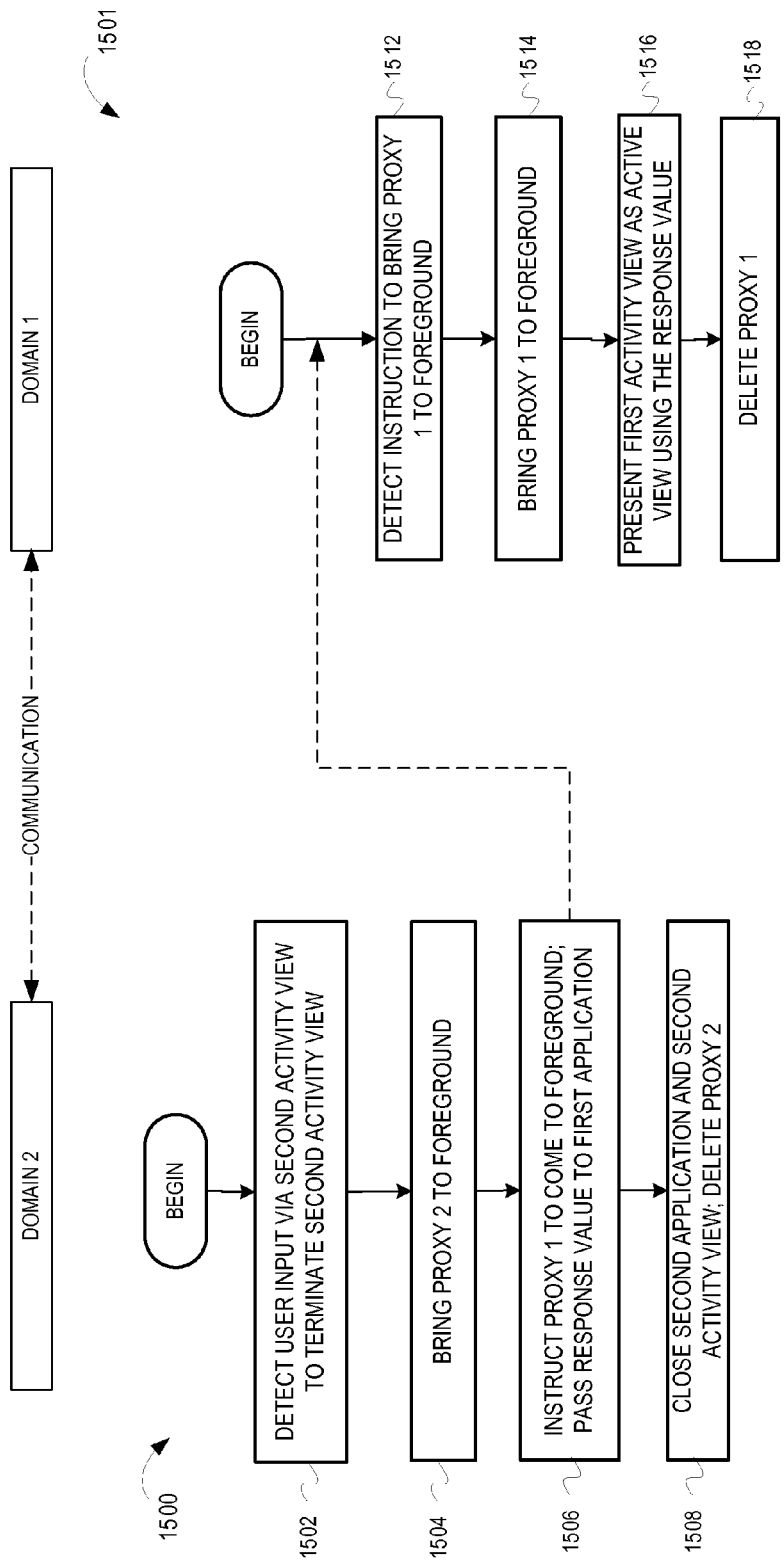

COORDINATING ACTIVITY VIEWS ACROSS OPERATING SYSTEM DOMAINS

BACKGROUND

This disclosure generally relates to managing presentation of related information on a device.

Many devices, including personal computers, mobile devices, smartphones, etc., utilize applications to present information. Each of the applications includes one or more user-interface elements for detecting user input, capturing user input, and/or presenting data. The user-interface elements may be referred to as widgets, windows, screens, views, or other such terms. An operating system on a device manages the applications and assists in the presentation of the information via the device. The operating system (OS) provides common services for the applications that are running on the device. In addition, the operating system controls presentation of the user-interface elements associated with the applications.

BRIEF DESCRIPTION OF THE DRAWINGS

The present embodiments may be better understood, and numerous objects, features, and advantages made apparent to those skilled in the art by referencing the accompanying drawings.

FIGS. 15A and 15B are example flow diagrams illustrating managing cross domain tasks.

DESCRIPTION OF EMBODIMENT(S)

Figure 1A:
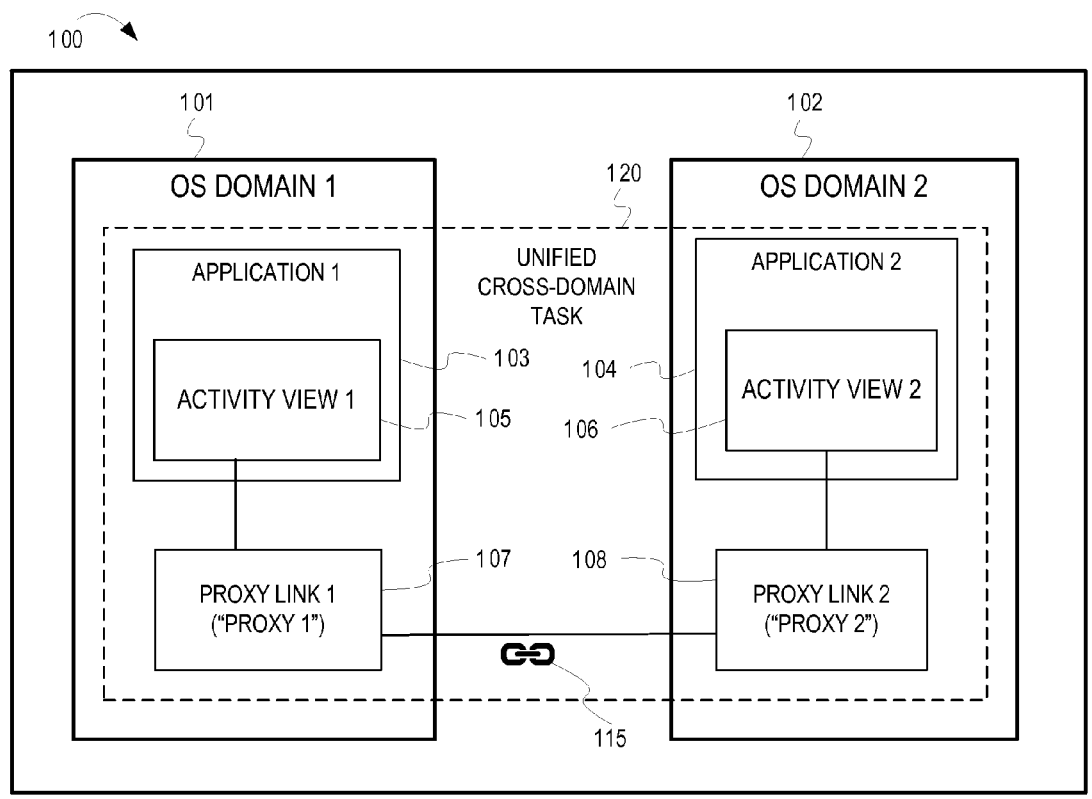
FIGS. 1A and 1B are example illustrations of managing a cross domain task using proxy links.

The description that follows includes example systems, methods, techniques, instruction sequences, computer program products that relate to managing tasks across multiple operating system domains. However, it is understood that the described embodiments may be practiced without these specific details. For instance, although examples may refer to operating system instances of a mobile device, it should be understood that the same, or substantially similar techniques, may apply to any type of device that has an operating system. In other instances, well-known instruction instances, protocols, structures and techniques have not been shown in detail in order not to obfuscate the description.

An application may have multiple user interfaces defined for presentation of data and/or capturing input. These user interfaces are referred to herein as "activity views." Each activity view corresponds to one or more activities. An activity, as used herein, refers to a particular function or functions of an application, and refers to a single thing that a user can do within that application. For instance, taking a picture is an activity of a camera application. Therefore, the camera application presents an activity view for taking the picture. The activity view can have selectable elements, such as a graphical "picture button," which can be selected, via user input, to initiate the activity of taking the picture. The selection of the picture button would trigger an event that causes the taking of the picture via a camera. The operating system can respond to the event, such as by providing the camera application access to camera resources.

When a group of one or more activity views are related to a same executing processor thread, the group of activity views may be referred to herein as a task. Several activity views may be associated with a same "task" based on relationships among the activity views. These relationships can be internally defined (e.g., activity views of a same application or application type, such as image applications) or externally defined (e.g., activity views related based on sequence of inputs). For example, when a camera application is launched (e.g., by a first user input), a task may be created due to launching the application. The camera application may present a first activity view associated with the task. A selectable element on the first activity view can be configured to, when selected by a second user input, open a media management application (e.g., a photo/video gallery). Upon receiving the second user input, the media management application launches and presents a second activity view, such as a "gallery" activity view. The second activity view may be associated with the same task that was begun with the camera application. The operating system can group together the first activity view and the second activity view in the task according to the order in which the first user input and the second user input occurred. As such, the associated activity views may be considered part of the same task within the operating system. The operating system can group activity views based on relationships between the activity views, even if the activity views come from different applications (e.g., when the applications are linked to provide a seamless user experience).

For various reasons (e.g., security), a device can be configured to host multiple operating system instances (referred to herein as "operating system domains"). In such a scenario, applications of the operating system domains have limited access to each other's data and limited visibility, if any. For example, a first OS domain can be designated as a personal domain and a second OS domain as a work domain. The first OS domain can host consumer oriented applications (e.g., a social network application, restaurant location applications) and an e-mail application configured for personal e-mail accounts. The second OS domain can host various productivity applications and an e-mail application configured for a work account. To confine data (as configured) within the host OS domains, an isolation mechanism (e.g., a firewall) can be configured on a device with multiple OS domains.

It may be possible for a task to group applications in different OS domains. Such tasks may be referred to as cross domain tasks, and cross domain tasks may include activity views from different domains. According to some embodiments, a "cross domain event" can be channeled through "proxies." A cross domain event refers to an event (e.g., mouse click event, screen tap event, etc.) detected in a first OS domain that crosses into another OS domain. An event crosses into another OS domain when it causes execution of program code that presents data of an application of another OS domain. For example, a mouse click on a graphical button in a camera application hosted in a first OS domain crosses into a second domain if that graphical button causes presentation of a media management application (e.g., a photo/video gallery) hosted in a second OS domain. With proxies, tasks that reside in different OS domains can be cohesively presented as if a single task. The proxies are processes or applications that communicate across the OS domain boundaries and operate as proxies for activity views in different OS domains. The proxies handle communications to coordinate transitions between activity views of different OS domains.

Figure 1B:
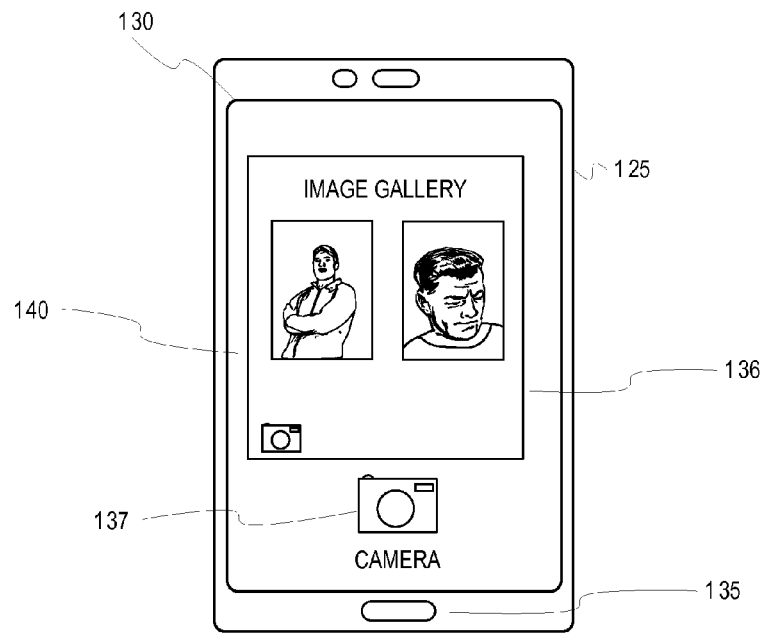

FIGS. 1A and 1B are example illustrations of managing a cross domain task using proxy links. In FIG. 1A, a device 100 runs two independent operating system domains ("OS domains"): first OS domain 101 and second OS domain 102. A first application 103 (e.g., a camera application) runs on the first OS domain 101. A second application 104 (e.g., a gallery application) runs on the second OS domain 102. The first application 103 presents a first activity view 105 (e.g., a main activity view for a camera application). The second application 104 presents a second activity view 106 (e.g., a main activity view for a gallery application). The second activity view 106 may be launched or opened in response to user input from the first activity view 105, or vice versa. If one of the activity views is opened in response to input in the other activity view, then the device 100 groups the first activity view 105 from the first OS domain 101 and the second activity view 106 from the second OS domain 102 into a cross domain task.

To manage the cross domain task across the first OS domain 101 and the second OS domain 102, the first OS domain 101 may assign a first proxy 107 to the first activity view 105. The first proxy 107 represents the first activity view 105 in the first OS domain 101, and may be hidden from view. The second OS domain 102 assigns a second proxy 108 to the second activity view 106. The first proxy 107 is linked with the second proxy 108. As an example, the proxy links can be linked to each other with an identifier (e.g., identifier 115, also may be referred to as a token). Because a proxy in one OS domain is configured to be linked to a proxy in another OS domain, and vice versa, herein the proxies referred to as a "proxy links." Therefore, the first proxy 107 will henceforth be referred to as the "first proxy link 107" and the second proxy 108 will henceforth be referred to as the "second proxy link 108." The second proxy link 108 represents the second activity view 106 in the second OS domain 102 and may also be hidden from view.

The first proxy link 107 and the second proxy link 108 are formed, in this example illustration, when a task becomes a cross domain task. The first application 103 presents the first activity view 105, such as by presenting a camera activity view. The first application 103 then detects a selection in the first activity view 105 to launch an activity associated with the second activity view 106, such as detecting selection of a button in the first activity view 105 to launch the second application 104. Since a task that included an activity corresponding to the first activity view 105 now also includes the launched activity associated with the second activity view 106 of the second OS domain 102, that task becomes a cross domain task. In response to detecting the selection of the button, the first OS domain 101 (e.g., a system process, such as an application launcher) determines that the second application 104 corresponds to the second OS domain 102. The first OS domain 101 then generates the first proxy link 107 and sends a message to the second OS domain 102 to generate the second proxy link 108. The first OS domain 101 assigns the identifier 115 to the first proxy link 107. The first OS domain 101 also provides the identifier 115 to the second OS domain 102 so that the second OS domain 102 can assign the identifier 115 to the second proxy link 108. The second proxy link 108 causes the second application 104 to launch with the second activity view 106. Consequently, the OS domains have formed a unified cross domain task 120. In other words, the cross domain task is unified so that the first activity view 105 and the second activity view 106 can be presented (or prevented from being presented) via the display of the device 100 in ways that appear as if they belong together (e.g., as if they both originate from the first application 103).

The first OS domain 101 and the second OS domain 102 can, in cooperation, manage the unified cross domain task 120. For example, using the identifier 115, the first OS domain 101 and the second OS domain 102 communicate with each other about the first proxy link 107 and the second proxy link 108. For instance, when the second OS domain 102 determines that the second activity view 106 should be terminated (e.g., responsive to selection of a back button), the second OS domain 102 determines that the second activity view 106 is associated with the second proxy link 108 and the identifier 115. The second OS domain 102 then causes the second proxy link 108 to come to a foreground of the display. The second proxy link 108 detects that it comes to the foreground and initiates a message indicating the identifier 115. The message indicates for a proxy link in the first OS domain 101 (which is associated with the identifier 115), to come to the foreground. The second OS domain 102 sends the message to the first OS domain 101. The first OS domain 101 determines that the received identifier 115 is associated with the first proxy link 107. Consequently, the first OS domain causes the first proxy link 107 to come to the foreground. The first proxy link 107 detects that it is coming to the foreground and causes the first activity view 105 to instead come to the foreground to be displayed. Therefore, when the first OS domain 101 and the second OS domain 102 communicate with each other about the first proxy link 107 and the second proxy link 108 (using the identifier 115) the OS domains can, together with the use of the proxy links, manage a unified presentation order for the stack of activity views from both applications ("unified activity view stack"). In other words, when the second activity view 106 is closed (e.g., via pressing the "back" button on the device 100), through the use of the proxy links 107 and 108, the first activity view 105 is automatically presented.

In FIG. 1B, an example of the device 100 from FIG. 1A is depicted as a mobile device 125. The mobile device 125 includes all of the components shown in FIG. 1A. The mobile device 125 further includes a task switcher that can present a task list that includes the unified cross domain task 120 via a display 130. For example, a task switcher presents a view of all the tasks that are running on the device 100. However, instead of presenting a first task view for the part of the unified cross domain task 120 managed by the first OS domain 101 and a second task view for the part of the unified cross domain task 120 managed by the second OS domain 102, the task switcher presents a single, unified task view ("unified task view 140"). The unified task view 140 may show only the top or active activity view on the unified activity view stack. For instance, when the second activity view 106 is active, the task switcher may be initiated via user input (e.g., via double-click of the device button 135 or some other user interface command). In response to the user input, the second OS domain 102 determines that the second activity view 106 is linked with the first activity view 105 via the proxy links (e.g., determines that the second proxy link 108 is linked to the first proxy link 107). Consequently, the task switcher presents in the unified task view 140 only a thumbnail image 136 of the second activity view 106 and does not present a thumbnail image of the first activity view 105. The task switcher also determines that the unified cross domain task 120 was initiated from the first application 103. The task switcher may show an icon 137 that is associated with the first application 103 as the application that initiated the task. Thus, by presenting the thumbnail image 136 of the second activity view 106 and the icon 137 as part of the same unified task view 140, the task switcher causes the second activity view 106 to appear to be from the first application 103, even though the second activity view 106 is actually from the second application 104 in the second OS domain 102.

Figure 2:
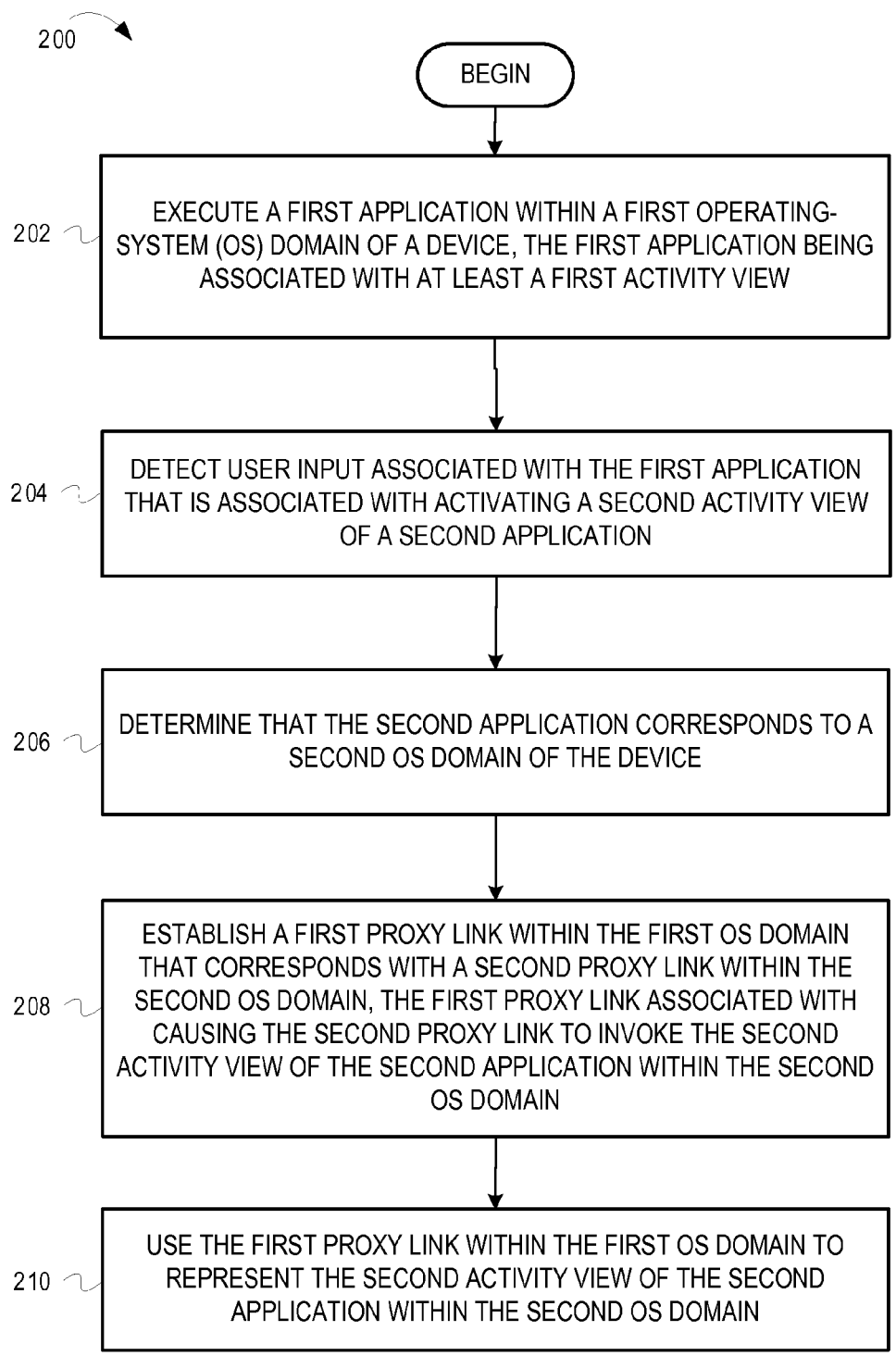
FIG. 2 is an example flow diagram illustrating establishing and using proxy links for multiple OS domains.

FIG. 2 is an example flow diagram ("flow") 200 illustrating establishing and using proxy links for multiple OS domains. FIGS. 3, 4, 5, 6, 7, 8, and 9 ("FIGS. 3-9") are conceptual diagrams that help illustrate the flow of FIG. 2. This description will present FIG. 2 in concert with FIGS. 3-9.

In FIG. 2, the flow 200 begins at block 202, where a device executes a first application within a first operating system (OS) domain of a device. The first application is associated with at least a first activity view. For example, as mentioned in FIGS. 1A and 1B, the first application may be the camera application and the first activity view may be the main view that is presented when the camera launches.

The flow 200 continues at block 204, where the device detects user input associated with the first application that is associated with activating a second activity view of a second application. The user input associated with the first application may activate a command launch an activity view of a second application. For example, the command to launch the second application activity view may be invocation of a callback function defined for a user input event (e.g., graphic button selection). To illustrate, a first activity view of a camera application is presented. The first activity view may have user-input elements, such as buttons, slider controls, etc., related to taking pictures and/or videos with a camera included in the device. Also, the first activity view may also include a user-input element (e.g., a graphical button) that, when selected, would cause a second activity view to appear, such as the gallery activity view for a second application which presents user-input elements related to viewing, editing, and deleting the pictures and videos taken via the camera application.

The flow 200 continues at block 206, where the device determines that the second application corresponds to a second OS domain of the device. The first application is different from the second application. The first OS domain is different from the second OS domain (e.g., separate, concurrently running instances of an OS). The device may be in a mode that runs only one OS domain. As such, the device would not determine whether the second application corresponds to a different OS domain. As context for the description of block 206, this disclosure will first describe, via FIGS. 3-5, an example of managing tasks for only one OS domain. The description will then describe, via FIGS. 6-9, an example of managing tasks for multiple OS domains.

Figure 3:
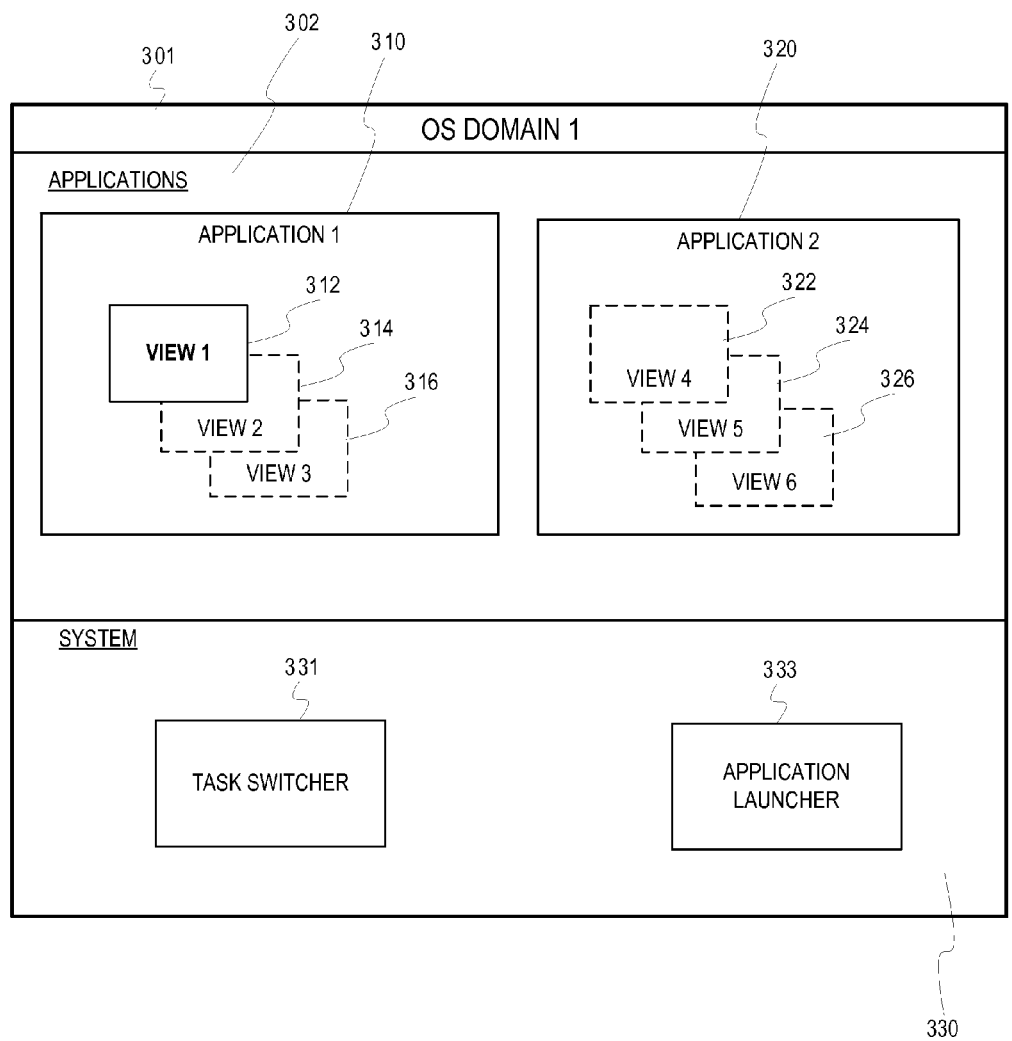
FIG. 3 is an example illustration of presenting an activity view of a first application associated with a first OS domain.

Referring to FIG. 3, a first OS domain 301 is illustrated. The first OS domain 301 has various applications 302 that have been installed, such as a first application 310 and a second application 320. The applications 302 have various activity views ("views") that are presentable via a display. The various views may be associated with separate types of activities to perform for the given application. For example, the first application 310 includes a view 312, a view 314, and a view 316. As an example, the first application 310 may be a camera application. View 312, for example, may be the main view used to take pictures for the camera application. View 314 may be a second view used to take videos. View 316 may be a third view used to control settings and preferences for the camera application. The second application 320 also includes multiple views, such as view 322, view 324, and view 326. As an example, the second application 320 may be a gallery application to view, edit, and delete pictures and videos. View 322 may be the main view of the gallery application used for viewing pictures and videos. View 324 may be a second view of the gallery application used to edit the pictures and videos. View 326 may be a third view used to control settings and preferences for the gallery application.

The first OS domain 301 also includes system elements 330. The system elements 330 manage certain elements of the applications 302. For example, the system elements 330 can manage tasks and the presentation of views associated with tasks. Some examples of system elements 330 include a task switcher 331 and an application launcher 333. The application launcher 333 is configured to manage installed applications in the operating system domain, and may be called when one application launches an activity view from another application. The task switcher 331 is configured to present a task list and can present representations of the particular tasks as "task views" via a display of the device. The task views may be represented as a thumbnail image of the top activity view active for each task.

In FIG. 3, view 312 is depicted as being presented as an active view of the display of the device. For example, view 312 has a non-dashed outline. Views 314, 316, 322, 324, and 326 have dashed outlines to depict that they are not being presented via the display device. An active view refers to a view that is visible via the display. For instance, some devices, such as mobile devices, have small display screens relative to the display screens for larger computing devices. Thus, some devices utilize operating systems that will present only one view at a time via the display. The active view is the view that is presented. The active view will typically take up more of the display area than other views, and may take up all of the display area. Several applications may be running on the device. In this example illustration, both the first application 310 and the second application 320 are running, but a view of one of the applications is active. The task switcher 331 of the device, when activated, can present a thumbnail of the last accessed view from any application that is running on the device. For tasks with views associated with different applications, the task switcher 331 will present a thumbnail of the last accessed view from the view stack for a given task.

Figure 4:
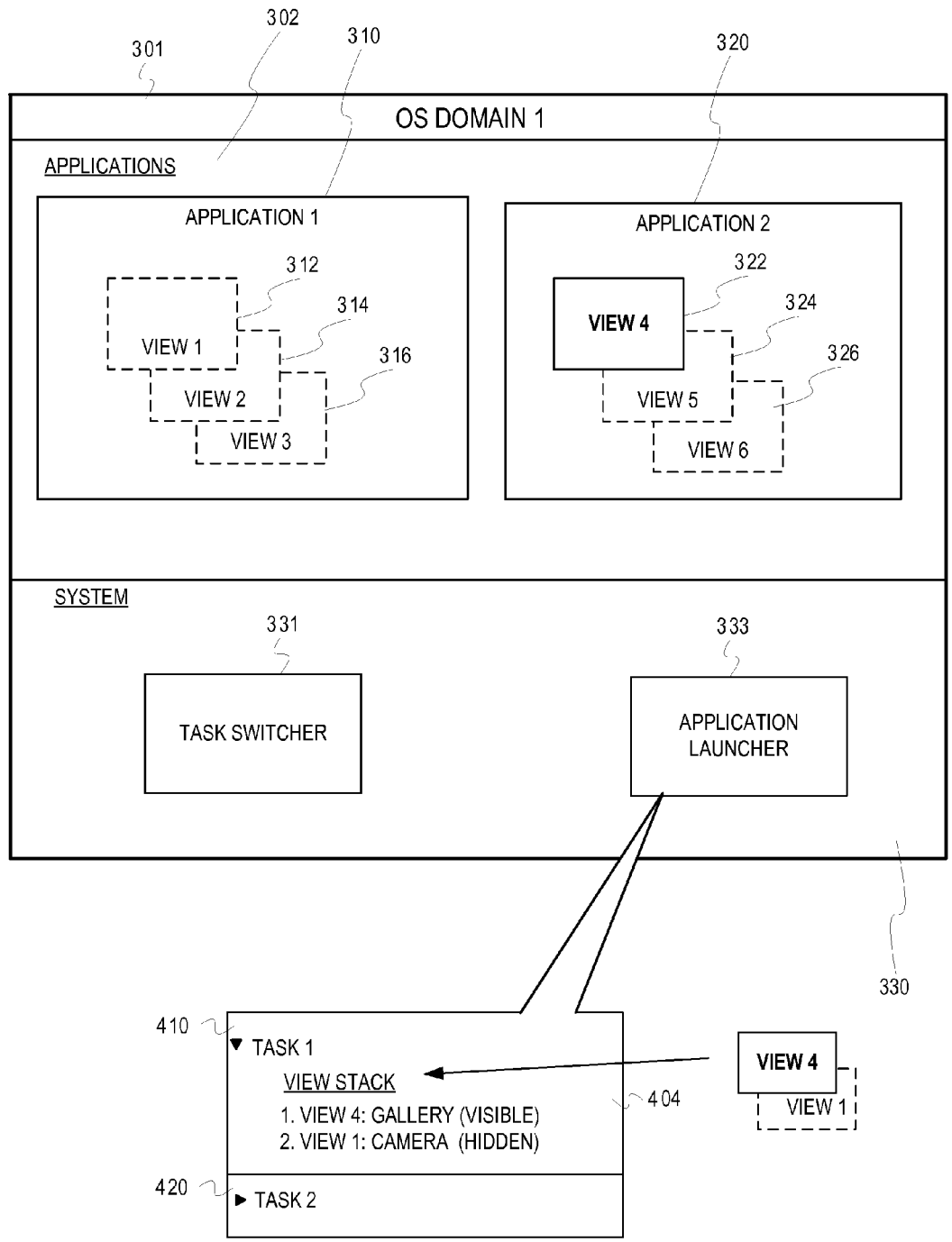
FIG. 4 is an example illustration of presenting an activity view of a second application associated with a first OS domain.

FIG. 4 illustrates an example of what the views would look like after view 322 is activated in response to user input associated with view 312. For example, view 312 can include a graphical button that can be selected to launch the second application 320. When the graphical button is selected, an operating system procedure to launch the second application 320 may include the application launcher 333 determining whether the second application 320 is installed and determining the location of the second application 320. Responsive to the graphical button, the second application 320 launches and automatically presents view 322. The application launcher 333 now tracks a task that spans the first application 310 and the second application 320. For example, the application launcher 333 will store identifiers for view 322 and view 312 in a database record. The record may also include an identifier for the task. The record may also specify a stack order for the views 322 and 312. Thus, the information to maintain the views 322 and 312 within an ordered stack is packaged into the record by the application launcher 333. When the task switcher 331 is activated, the task switcher 331 obtains data 404 from the application launcher 333 regarding tasks. The data 404 describes all tasks running on the device as well as any given task's view stack. The task switcher 331 can use the data 404 to present a visual depiction of the view stack for any given task. For example, the data 404 includes information for two separate tasks that are running on the device, a first task 410 (i.e., "task 1") and a second task 420 (i.e., "task 2"). The first task 410 includes the view stack for the task that relates to the first application 310 and the second application 320, where the last accessed view is view 322. The second task 420 includes a view stack for a combined email task.

Figure 5:
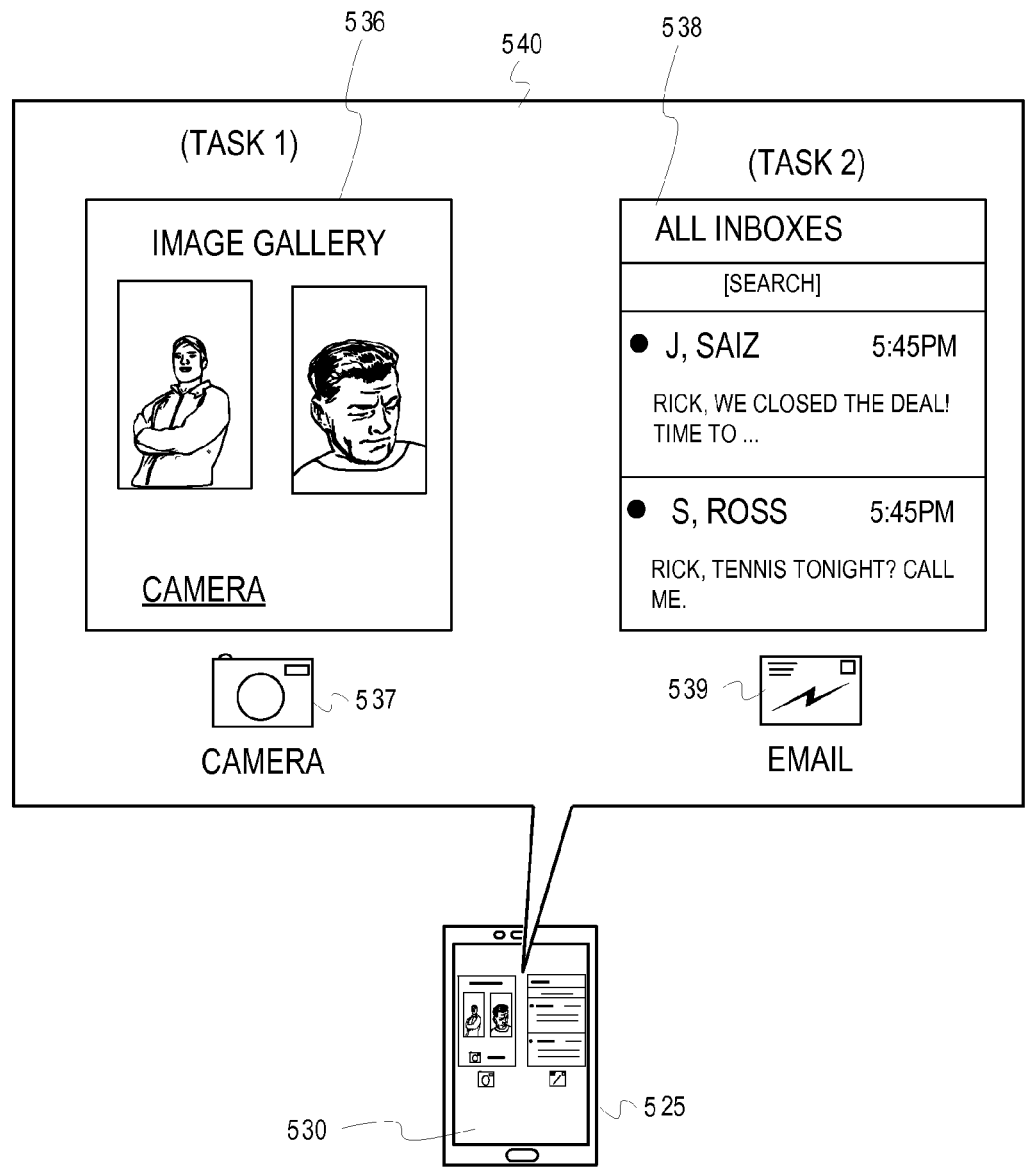
FIG. 5 is an example illustration of presenting a task view when a task switcher is activated for a device.

FIG. 5 depicts an example device 525. The device 525 presents a task view 540 when the task switcher 331 is activated. For this illustration, the task switcher 331 is activated when the view 322 is the active view. Therefore, the task view 540 only shows a representation of the view 322 for the first task 410. For example, the task switcher 331 presents a first thumbnail image 536 that represents view 322. The task switcher 331 also determines, from the data 404, that the first task 410 is initiated from the first application 310. Consequently, the task switcher 331 shows a first icon 537 that represents the first application 310. Thus, by presenting the first thumbnail image 536 and the icon 537 as part of the same representation of the first task 410, the task switcher 331 causes the view 322 to appear to be from the first application 310, even though the view 322 is actually from the second application 320. The task view 540 also presents a representation of the second task 420, which includes a thumbnail image 538 for the last accessed view for the second task 420. Further, an icon 539 indicates the originating application for the second task 420.

Figure 6:
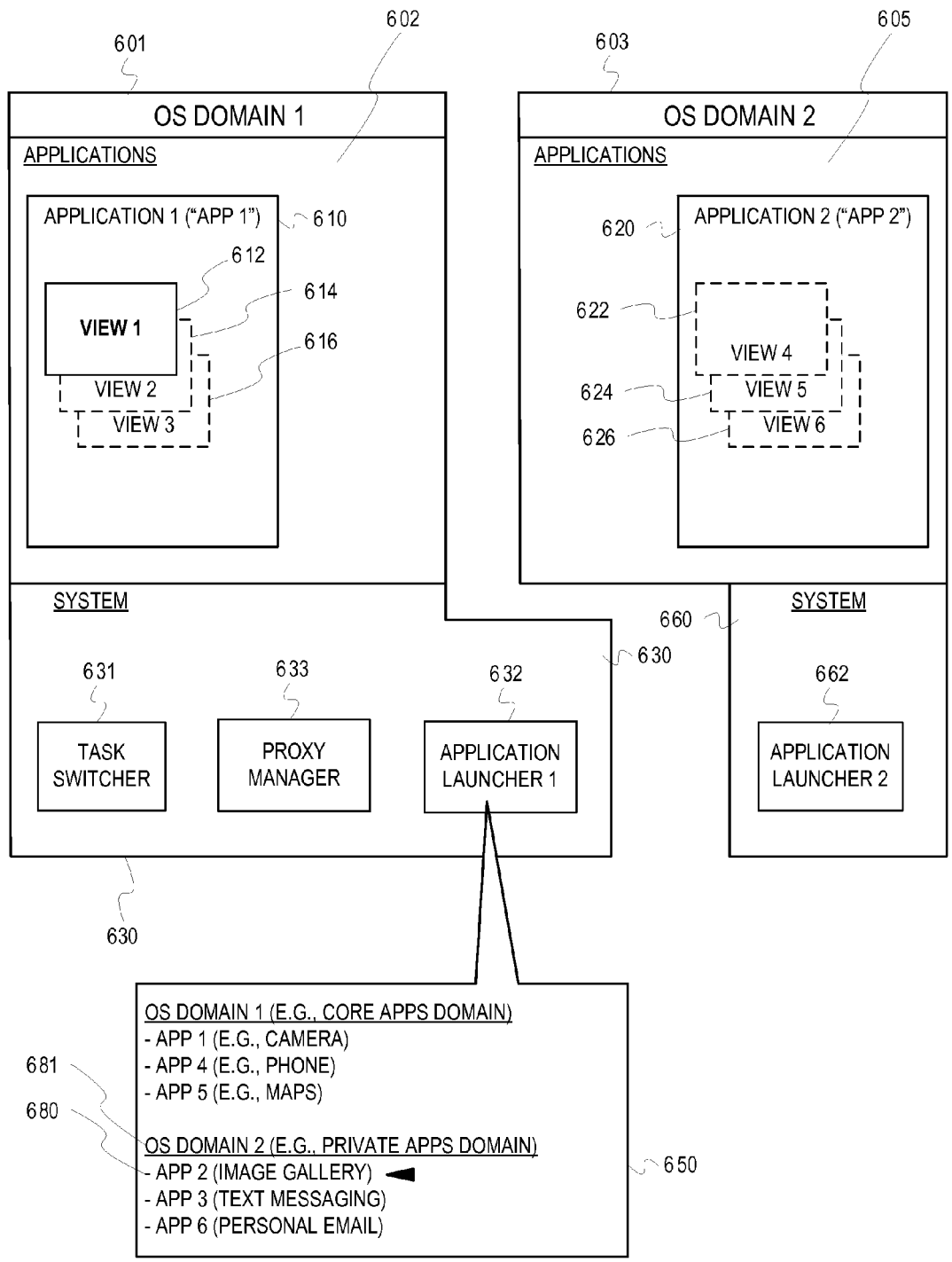
FIG. 6 is an example illustration of determining a cross-domain task.
Figure 7:
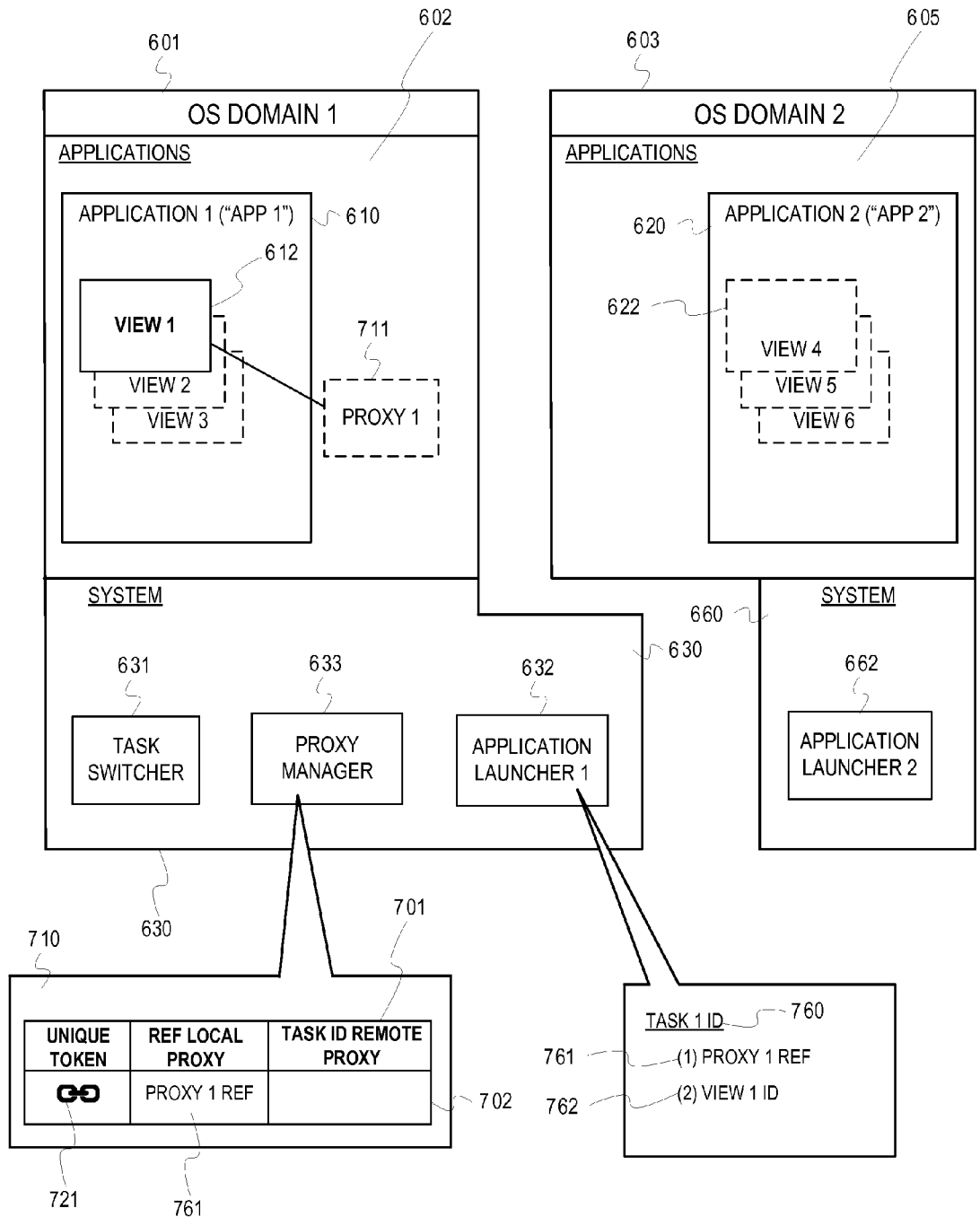
FIGS. 7 and 8 are example illustrations of establishing and using proxy links for a cross-domain task associated with multiple OS domains.
Figure 8:
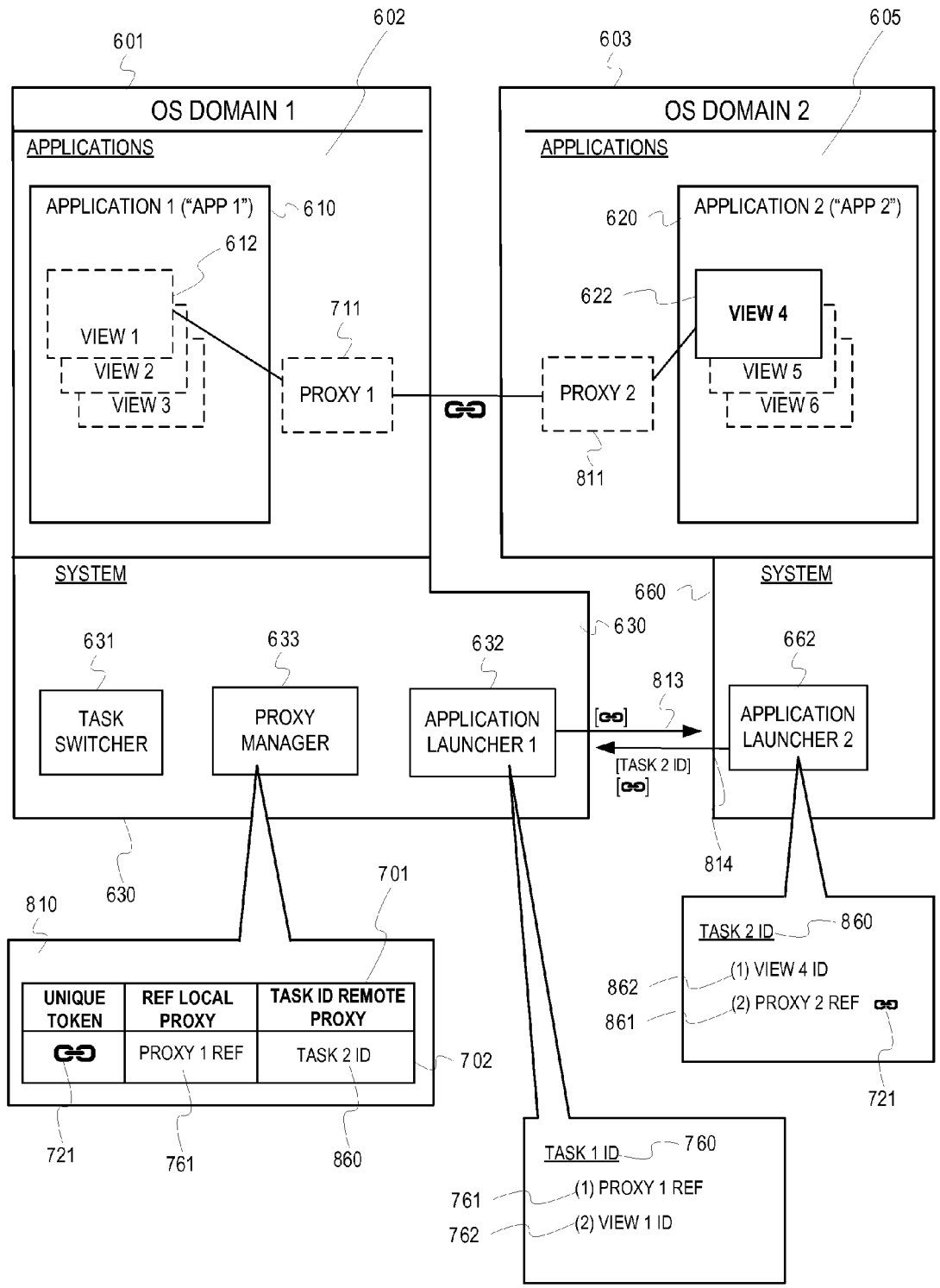

Now, using FIGS. 6, 7, and 8 ("FIGS. 6-8") as examples, this description will describe blocks 206, 208, and 210, which pertain to a cross domain task. In FIG. 6, a first OS domain 601 is illustrated. The first OS domain 601 has various applications 602 that have been installed in the first OS domain 601. For instance, the first OS domain 601 may pertain to a first type of application of the device, such as "core" applications for a mobile device (e.g., a camera application, a phone application, a maps application, etc.). The first application 610 is instantiated in the first OS domain 601. The applications 602 have various activity views ("views") that are presentable via a display. The various views may be associated with separate types of activities to perform for the given application. For example, the first application 610 includes view 612, view 614, and view 616.

The first OS domain 601 also includes system elements 630 including a task switcher 631, a first application launcher 632 ("application launcher 1") and a proxy manager 633. The application launcher 632 is configured to launch and track activity views and tasks contained within the first OS domain 601. The proxy manager 633 is configured to track cross domain tasks and manage proxy links between the first OS domain 601 and the second OS domain 603. The task switcher 631 is configured to present representations of the particular tasks in a task list via a display of the device.

In FIG. 6, view 612 is depicted as being presented as the active view of the display of the device. When the view 612 is active, a graphical button of the view 612 may be selected to launch a second application 620. The second application 620, however, is not in the first OS domain 601, but is instead in a second OS domain 603. The second OS domain 603 has various applications 605 that have been installed in the second OS domain 603. For instance, the second OS domain 603 may pertain to a second type of application of the device, such as "personal" or "private" applications for a mobile device (e.g., an image gallery application, a text messaging application, a personal email application, etc.). The second application 620 has been instantiated in the second OS domain 603. The applications 605 have various activity views ("views") that are presentable via a display. The various views may be associated with separate types of activities to perform for any given application. For example, the second application 620 includes view 622, view 624, and view 626. Furthermore, the second OS domain 603 also includes system elements 660 including a second application launcher 662 ("application launcher 2"). The second application launcher 663 is configured to launch and track activity views and tasks contained within the second OS domain 603.

Referring momentarily back to FIG. 2, block 206 indicates that the device determines that a second application corresponds to a different OS domain of the device than the first application. For example, in FIG. 6, when the view 612 is active, and after the button is selected to launch the second application 620, the first application launcher 633 accesses application data 650. The application data 650 specifies the first OS domain 601 and the second OS domain 603, and also includes, for each of the first OS domain 601 and the second OS domain 603, a listing of each of the applications instantiated in each domain. The first application launcher 633 detects that the second application 620 is installed in the second OS domain. For instance, the first application launcher 633 can search or parse the application data 650 to find an indicator 680 associated with the second application 620. The first application launcher 633 can also determines that the indicator 680 for the second application 620 is associated with an indicator 681 for the second OS domain 603 indicated in the application data 650. In other examples, the first application launcher 633 may only have access to a portion of the application data 650, such as only the portion pertaining to the first OS domain 601. The first application launcher 633 can query other OS domains to confirm which domain the second application 620 is instantiated within. For example, in some embodiments, each OS domain has OS elements that track applications instantiated within that particular domain. With no visibility of other OS domains or limited visibility of other OS domains, the OS domains can utilize a process responsible for inter-domain communications. This process ("inter-domain coordinator") inherits a special kernel permission to pass through an OS domain isolation mechanism (e.g., an OS domain firewall), for example. When the second application is not discovered in the application tracking data of the first OS domain, the inter-domain coordinator queries the other OS domains. The OS domain with an instance of the second application responds with an indication of the OS domain. This indication can be implicit (e.g., when there are only two OS domains on a device) or explicit (e.g., an OS domain identifier indicated in a response). In some embodiments, each OS domain can access a global directory that is not visible to applications to determine a host OS domain of an application. As applications are instantiated, the host OS domains update the global directory. Locks can be avoided by provisioning different sections or different structures to the different OS domains. In some embodiments, a directory can be created when the different OS domains are configured with the different application assignments.

Because view 612 has received a selection associated with launching the second application 620, and the second application 620 is installed in the second OS domain 603, a new task in the second OS domain 603 will become part of a cross-domain task that also includes the existing task in the first OS domain 601. As described previously, the proxy manager 633 is involved in establishing a proxy link between the two domains.

Returning momentarily to FIG. 2, the flow 200 continues at block 208, where the device establishes a first proxy link within the first OS domain that corresponds with a second proxy link within the second OS domain. The first proxy link is associated with causing the second proxy link to invoke the second activity view of the second application within the second OS domain.

FIGS. 7 and 8 illustrate one example of establishing a first proxy link within a first OS domain that corresponds with a second proxy link within a second OS domain. In FIG. 7, the first application launcher 632 has determined (e.g., via accessing the application data 650 in FIG. 6), that the second application 620 is associated with the second OS domain 603. When view 612 was launched as a first task, the first application launcher 632 associated view 612 with a first task ID 760 for the first task. A record of the first task ID 760 includes a view identifier 762 ("view 1 ID") associated with the view 612. Because the button was selected from the view 612 to launch the second application 620 and the second application 620 is associated with the second OS domain 603, a cross-domain task will be established.

As a result of the view 612 receiving a selection to open the view 622 of the second application 620, a command is sent to the first application launcher 632 to launch the second application 620. The first application launcher 632 determines that the second application 620 is associated with a different domain than the first OS domain 601, the first application launcher 632 launches a first proxy link 711 ("proxy 1"). The first proxy link 711 may be an activity view that is not visible. The application launcher 760 may generate an object reference for the first proxy link 711. The object reference to the first proxy link 711 will be referred to as the first proxy reference 761 ("proxy 1 ref") stored with the first task ID 760 for the first task. The first application launcher 632 tracks a stacking order (or "view stack") for the first task by ordering the first proxy reference 761 above that the view identifier 762. After the first proxy link 711 is generated, the first application launcher 632 may attempt to bring the first proxy link 711 to a foreground of the display so that it is stacked above the view 612.

The first proxy link 711 generates a unique identifier (i.e., token 721) and provides the token 721 to the proxy manager 633. The proxy manager 633 generates an entry in a data store (e.g., the proxy manager 633 generates a record 702 in a database 701). The table 701 includes information about proxies in the first OS domain 601 that are bound to a task in a different OS domain, including information 710 pertinent to the cross domain task. For example, the record 702 may include the token 721 and the first proxy reference 761. The record 702 can also include information that identifies a second task in a different domain that is related to the first proxy link 711, which will be described in further detail in FIG. 8.

In FIG. 8, after receiving the token 721 from the first proxy link 711, proxy manager 633 initiates the creation of a second proxy link 811 in the second OS domain 603. For instance, the proxy manager 633 communicates the token 721 to the first application launcher 632 and requests that the first application launcher 632 send an instruction to the second application launcher 662 in the second OS domain 603. Thus, the first application launcher 632 sends a message 813 to the second application launcher 662 with the instruction to generate the second proxy link 811. The message 813 includes a copy of the token 721, which is used to generate the second proxy link 811. Responsive to the instruction to generate the second proxy link 811, the second proxy link 811 is launched and a second task ID 860 is created by the second application launcher 662 for the second proxy link 811. The task identifier for the second task will be referred to as second task ID 760 ("task 2 ID"). The second task is related to the second proxy link 811. The second application launcher 662 may send a message 814 to the first application launcher 632 to indicate a value for the second task ID 860.

The second proxy link 811 may be an activity view that is not visible and which includes specific instructions regarding itself and regarding view 622. The second proxy link 811 requests the second application launcher 662 to launch the second application 620 (if not already running) and bring the view 622 to the foreground. The second application launcher 662 may associate the view 622 with the second task ID 760. The second task is a second portion of the cross-domain task as it relates to the second OS domain 603. The second application launcher 662 stores information in an entry of a data store in the second OS domain 603. For example, the second application launcher 662 stores the second task ID 760. The second application launcher 662 also stores an object reference to the second proxy link 811. The object reference to the second proxy link 811 will be referred to as the second proxy reference 861 ("proxy 2 ref"). The identifier for the view 662 will be referred to as view identifier 862. The second application launcher 662 tracks a stacking order, or view stack, for the second task by ordering the view identifier 862 above the second proxy reference 861.

The proxy manager 633 may store the second task ID 860 in the record 702. Because the first proxy link 711 and the second proxy link 811 both have the same unique ID associated with them (i.e., the token 721), they are uniquely linked or bound together. Further, because the proxy manager 633 includes a copy of the second task ID 860, the token 721, and the first proxy reference 761, the proxy manager 633 has information that can be used by the task switcher 631 to link the first task to the second task as a cross-domain task.

Referring still to FIG. 8, the second proxy link 811 includes instructions and/or information limited to managing the presentation of the view 622 (e.g., to bring the second proxy link 811 into the foreground of the display when the view 622 is closed). As mentioned, when the second proxy link 811 is generated it may come to the foreground. The second proxy link 811, however, may not become visible. Rather, the activity that was selected via the view 612 is invoked, which causes the second application 620 to launch and which causes the view 622 to come to the foreground. Further, the first proxy manager 633 switches a domain view for the device to the second OS domain 603. Because the view 622 is in the foreground, when the domain view is switched to the second OS domain 603, the view 622 becomes visible on the display of the device. Therefore, an order of a cross-domain view stack for the cross domain task has the view 612 as the lowest level, the first proxy link 711 above the view 612, the second proxy link 811 above the first proxy link 711, and the view 622 above the second proxy link 811. The view 622 is the highest level in the cross-domain view stack because it is in the foreground. In some embodiments, the cross-domain view stack is composed of two parts. A first part is the view stack for the first task managed by the first OS domain 601 that pertains to the view 612 and the first proxy link 711. For instance, the first application launcher 632 tracks a state of the first proxy link 711 and a state of the view 612 as they are individually brought to the foreground. The first application launcher 632 stores the state information in a last-in-first-out queue (e.g., a first "back stack" queue), as shown in FIGS. 7 and 8 where the first proxy reference 761 and the view identifier 762 are ordered. The order in the first back stack queue indicates that the first proxy link 711 is above the view 612. The second part of the cross-domain view stack is the view stack for the second task managed by the second OS domain 603. For example, the second application launcher 662 tracks a state of the second proxy link 811 and a state of the view 622 as they are individually brought to the foreground. The second application launcher 662 stores the state information in a separate last-in-first-out queue (e.g., a second "back stack" queue), as shown in FIG. 8. The order in the second back stack queue indicates that the first proxy link 711 is above the view 612. In some embodiments, the first back stack queue and the second back stack queue are not combined. Rather, they are linked by virtue of the proxy links 711 and 811 (e.g., via the token 721), and are managed by the proxy manager 633. The proxy links 711 and 811 may be configured to communicate with each other (e.g., using the token 721 as a reference) regarding when to bring one or the other into the foreground. Because the proxy links 711 and 811 have the ability to communicate in such a manner, then the overall back stack sequence for the view stack of the cross domain task is maintained in the proper order.

Figure 9:
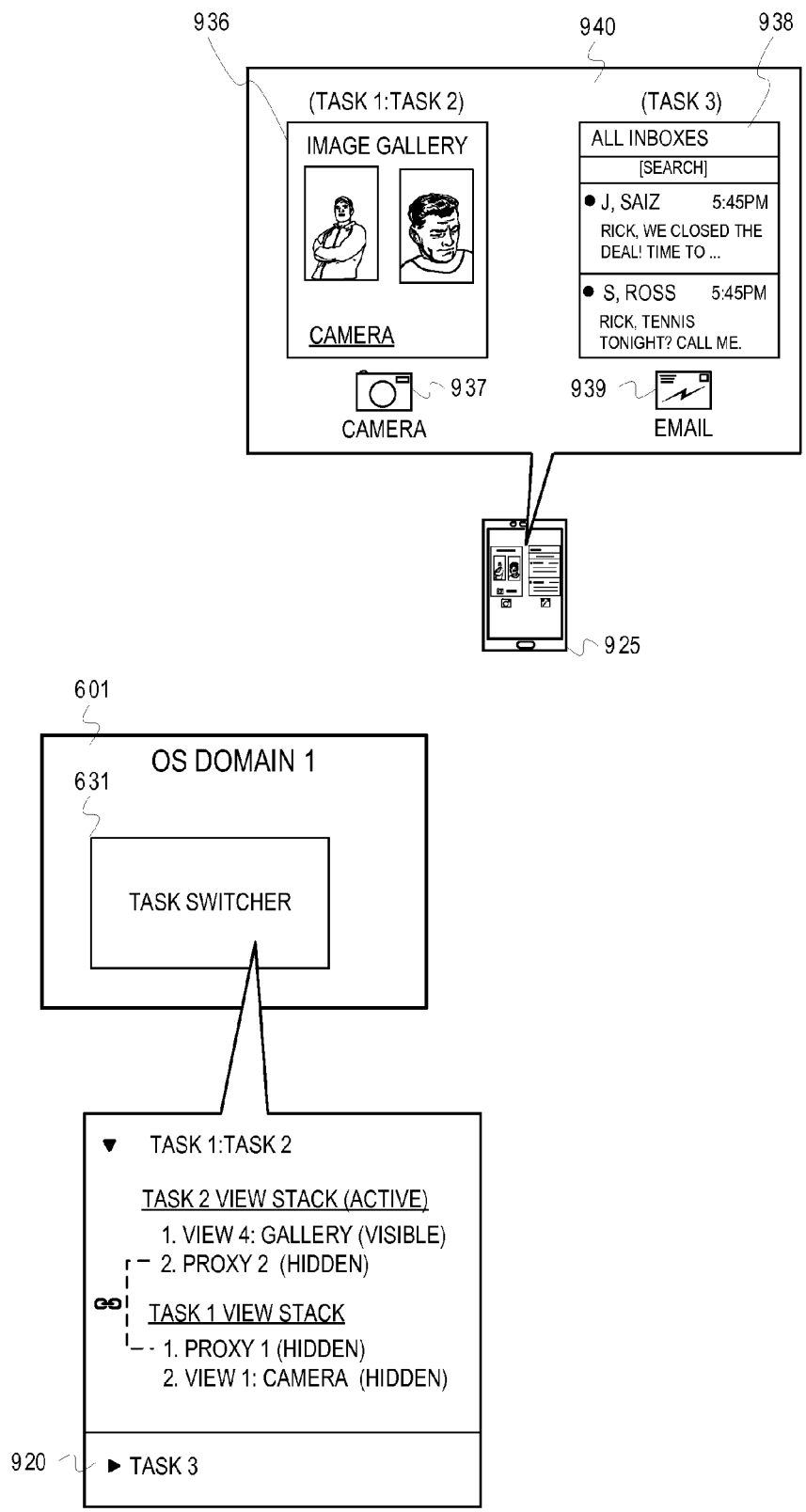
FIG. 9 is an example illustration of presenting a task view for a cross-domain task.

Returning momentarily to FIG. 2, the flow 200 continues at block 210, where the device uses the first proxy link within the first OS domain to represent the second activity view of the second application within the second OS domain. FIG. 9 illustrates one example of using the first proxy link within the first OS domain to represent the second activity view of the second application within the second OS domain. In FIG. 9, a task list 940 is launched on a device 925. The device 925 includes the components described in FIGS. 6-8. The task list 940 is launched by the task switcher 631. The task switcher 631 is configured to communicate with first application launcher 632 and the second application launcher 662 to obtain the information it needs to properly present a list of cross-domain tasks. For example, when the task list 940 is launched, the task switcher 631 will query the first application launcher 632 and the second application launcher 662 for all tasks that they are tracking. The first application launcher 632 sends to the task switcher a list of the information for the first task. For example, the first application launcher 632 may send the first task ID 760, the first proxy reference 761, and the view identifier 762. The task switcher 631 detects that the first proxy reference 761 is at the top of the view stack for the first task. The task switcher 631 then queries the proxy manager 633 (using the first proxy reference 761), to determine whether an entry exists in the table 701 for the first proxy reference 761. The proxy manager 633 detects the first proxy reference 761 in the record 702. The proxy manager 633 then returns to the task switcher 631 the second task ID 860. Because the proxy manger 633 returned the second task ID 860, the task switcher 631 determines that the first task is part of a cross-domain task. The task switcher 631 uses the second task ID 860 to query the second application launcher 662. The second application launcher 662 returns to the task switcher 662 the view stack for the second task 860. Thus, as shown in FIG. 9, the task switcher 631 determines a stacking order for the cross domain task. In other words, the task switcher 631 determines that the view 612 is within the view stack for the cross domain task. However, because the view 612 is associated with the cross domain task, and because the view 612 is not the active view, then the second task switcher 661 does not present a thumbnail image of the view 612 in the task list 940. Instead, because the view 622 is the active view (i.e. is highest on the view stack for the cross domain task), then the second task switcher 661 only presents a thumbnail image 936 of the view 622. However, because the view 612 is the lowest on the view stack for the cross domain task, and because the view 612 is associated with the first application 610, then the task switcher 631 can present an icon 937 that identifies the first application 610 as being the originating application for the cross domain task. Further, the task switcher 631 can detect other tasks that are running. For instance, the task switcher 631 detects that a third task 920 is running on the first OS domain 601. The task switcher 631 receives information from the first application launcher about the third task 920. The task switcher 631 then presents a representation of the third task 920 in the task list 940 (e.g., presents a thumbnail image 938 for the last accessed view in the third task and presents an icon 939 for the originating application for the third task 920).

Referring momentarily back to block 210, another example of using the first proxy link within the first OS domain to represent the second activity view of the second application within the second OS domain includes terminating the second activity view within the second OS domain and causing the first activity view to become the active view again. For example, referring to FIG. 8, when the view 622 is closed, the second application launcher 662 notifies the second proxy link 811 to come to the foreground. The second proxy link 811 initiates a communication with the proxy manager 633 (using the token 721), to bring the first proxy link 711 to the foreground. The second proxy link 811 shuts down the view 622 and the second proxy link 811 deletes itself. After receiving the communication from the second proxy link 811 to come to the foreground, the proxy manager 633 will use the token 721 to do a lookup in the table 701 to identify the first proxy link 711. The proxy manager 633 then instructs the first proxy link 711 to come to the foreground. As the first proxy link 711 begins to come to the foreground, the first proxy link 711 will cause the view 612 to come to the foreground instead. The focus of the display may switch back to the first OS domain 601. Because the view 612 is in the foreground, the view 612 becomes the active view. The first proxy link 711 then deletes itself. A more detailed explanation of this process is described in connection with FIGS. 15A, 15B, 16A, 16B, 17A and 17B.

Figure 10:
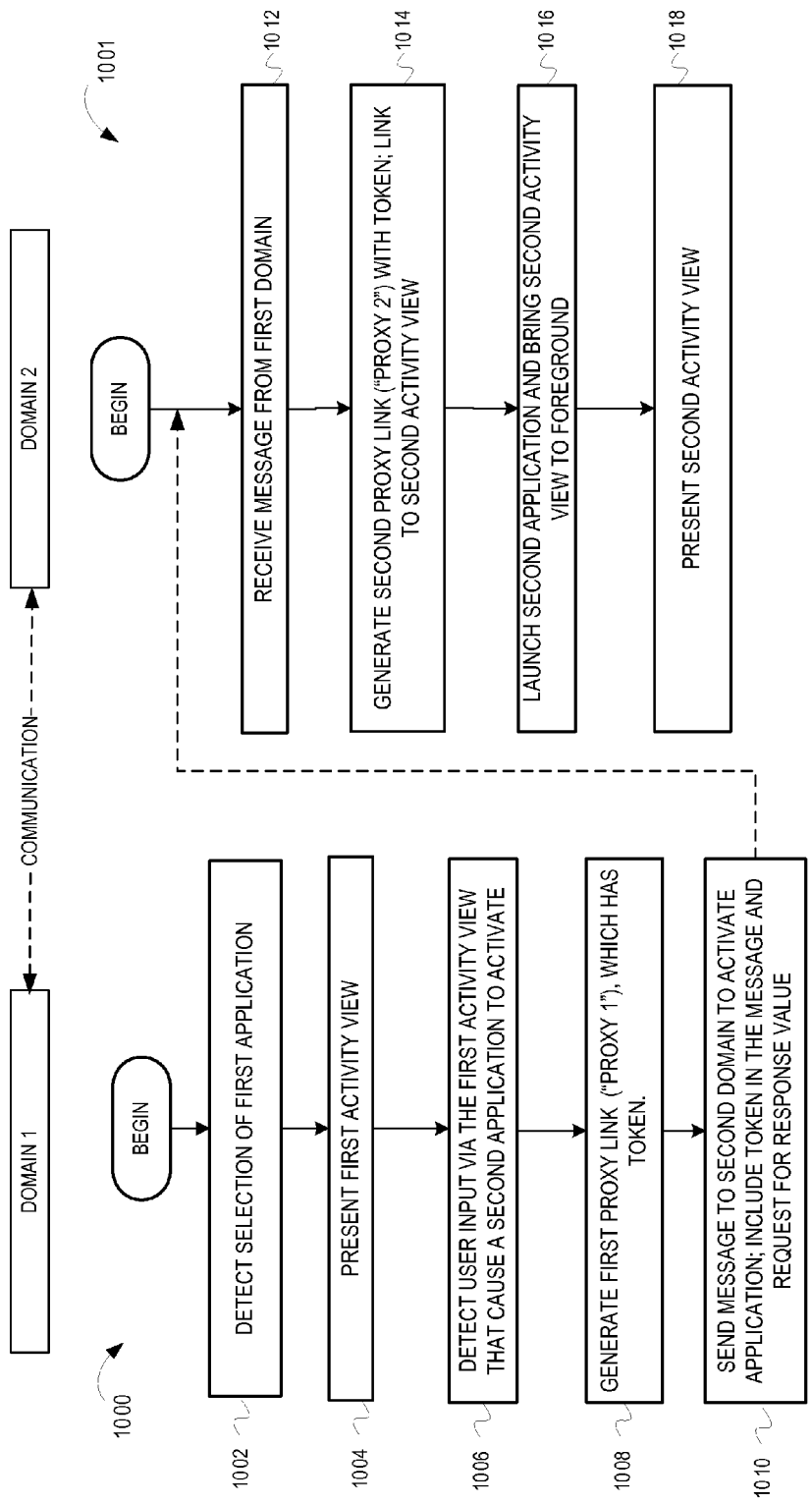
FIGS. 10A and 10B are example flow diagrams illustrating managing cross domain tasks with a response value.

FIG. 10A is an example flow diagram ("flow") 1000 illustrating managing cross domain tasks with a response value. FIG. 10B is an example flow diagram ("flow") 1001 illustrating managing cross domain tasks with a response value. FIGS. 12A, 12B, 12C, and 13A are conceptual diagrams that help illustrate the flows of FIGS. 10A and 10B, according to some embodiments. This description will present FIGS. 10A and 10B in concert with FIGS. 12A, 12B, 12C, and 13A. In some embodiments, the operations shown in FIGS. 10A and 10B can be performed in series, while in other embodiments, one or more of the operations can be performed in parallel.

Referring now to FIG. 10A, the flow 1000 begins at block 1002, where a device detects a selection of a first application. For example, in FIG. 12A a device 1225 presents a device selection screen 1280. The device 1225 detects the selection of an icon 1237 related to a camera application.

Referring back to FIG. 10A, the flow 1000 continues at block 1004, where the device presents a first activity view. For example, in FIG. 12B after the icon 1237 is selected, the device 1225 presents a first activity view 1212 for a camera application. The camera application is assigned to a first OS domain 1201. The first activity view 1212 provides features for taking pictures using a camera of the device 1225. For instance, the device 1225 detects that a picture button 1242 is selected which, in FIG. 12C, causes a preview image 1243 of the picture to be shown.

Referring back to FIG. 10A, the flow 1000 continues at block 1006, where the device detects user input via the first activity view that causes a second application to be activated. For example, in FIG. 12C, the first activity view 1212 presents a link 1244 to a gallery application. The link 1244 can be selected via user input. The link 1244 is configured to cause the gallery application to be launched in a second OS domain 1203.

Referring back to FIG. 10A, the flow 1000 continues at block 1008, where the device generates a first proxy link ("proxy 1"), which has an identifier (e.g., a token). For example, in FIG. 12C the first OS domain 1201 generates a first proxy link 1211. The first OS domain 1201 can generate the first proxy link 1211 according to the description in FIG. 7.

Referring back to FIG. 10A, the flow 1000 continues at block 1010, where the device sends a message to a second OS domain to activate the second application. The message includes the token and a request for a response value. For example, in FIG. 12C, when the link 1244 is selected, the first proxy link 1211 initiates a message 1213 to a second OS domain 1203. The message 1213 includes a copy of the token and a request to return a copy of the last picture that was taken after the gallery application is closed. For instance, the gallery application may include features to edit the last picture that was taken. Thus, the camera application requests a copy of the last picture that was taken to present it again as the preview image 1243.

Referring now to FIG. 10B, a flow 1001 begins at block where the device receives the message from the first domain and, based on the message, at block 1014, the device generates a second proxy link ("proxy 2") using the token. The device further links to second activity view. For example, in FIG. 13A the second OS domain 1203 receives the message 1213 and generates the second proxy link 1311. The second proxy link 1311 and the first proxy link 1211 are linked, for example, as similarly described in FIG. 2 and FIGS. 6, 7, 8 and 9.

Referring back to FIG. 10B, the flow 1001 continues at block 1016, where the device launches the second application and brings the second activity view to the foreground. For example, in FIG. 13A the second proxy 131 launches the gallery application and instructs the second activity view 1322 to come to the foreground. The second activity view 1322, the second proxy link 1311, the first proxy link 1211 and the first activity view 1212 are presented as being in a cross domain view stack, for example similar to the view stacks described in FIGS. 7, 8 and 9. The second activity view 1322 (in the foreground) is above the second proxy link 1311 in the cross domain view stack. The second proxy link 1311 is above the first proxy link 1211 in the cross domain view stack. The first proxy link 1211 is above the first activity view 1212 in the cross domain view stack.

Referring back to FIG. 10B, the flow 1001 continues at block 1018, where the device presents the second activity view. For example, in FIG. 13A after the device 1225 launches the gallery application and brings the second activity view 1322 to the foreground, the device switches the view focus for the device 1225 to the second OS domain 1203. The second view 1322 then becomes visible via a display of the device 1225.

Figure 11:
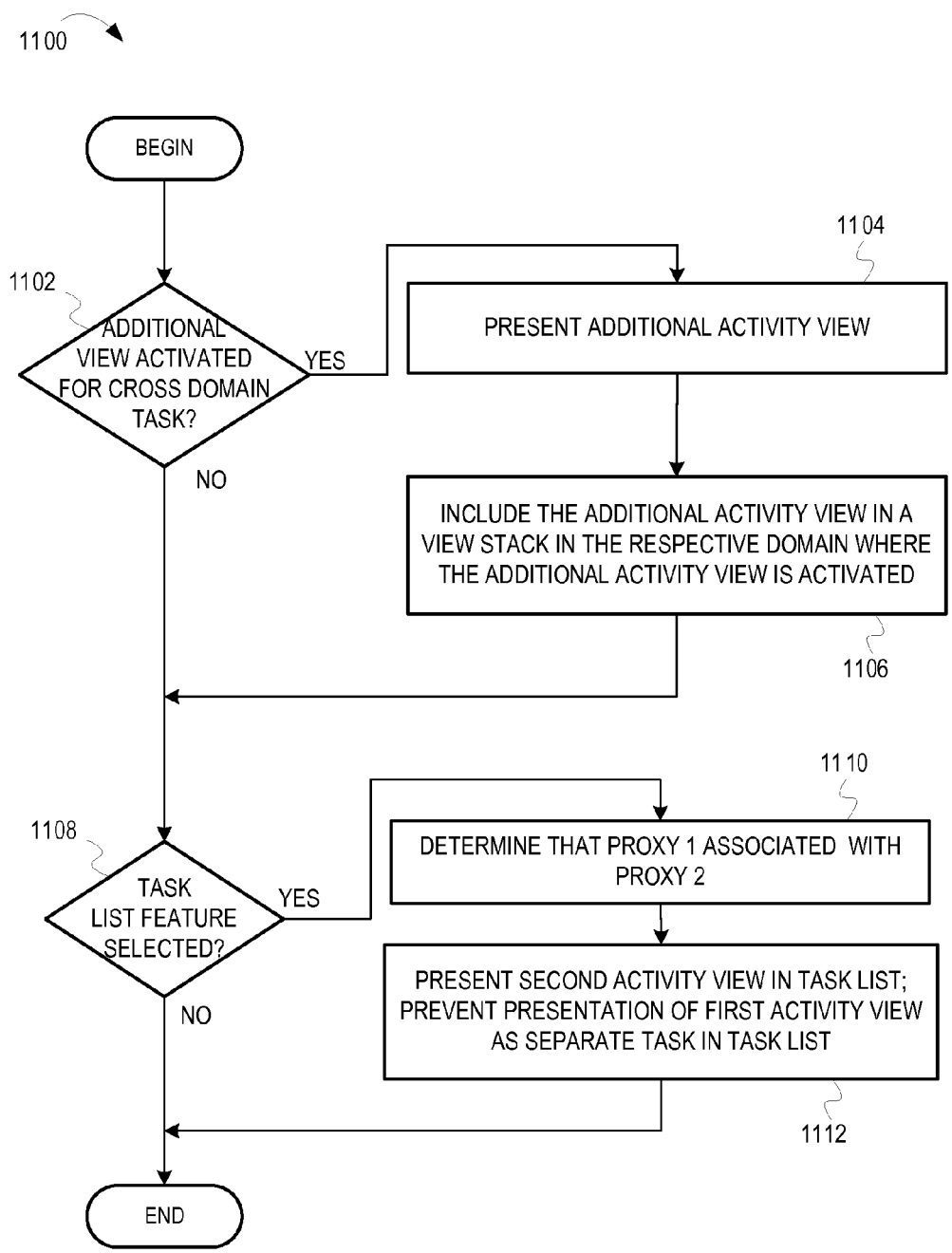
FIG. 11 is an example flow diagram illustrating presenting cross domain tasks.
Figure 12A:
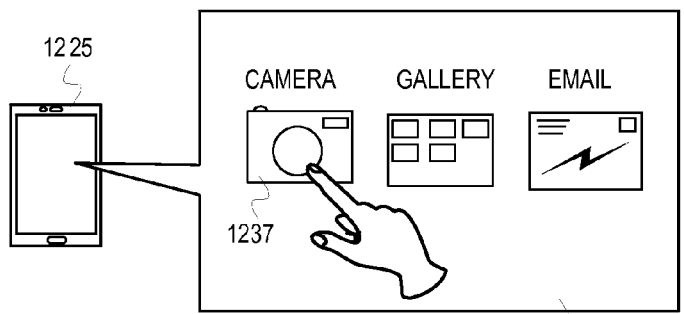
FIG. 12A is an example illustration of detecting a selection of a first application associated with a first OS domain.
Figure 12B:
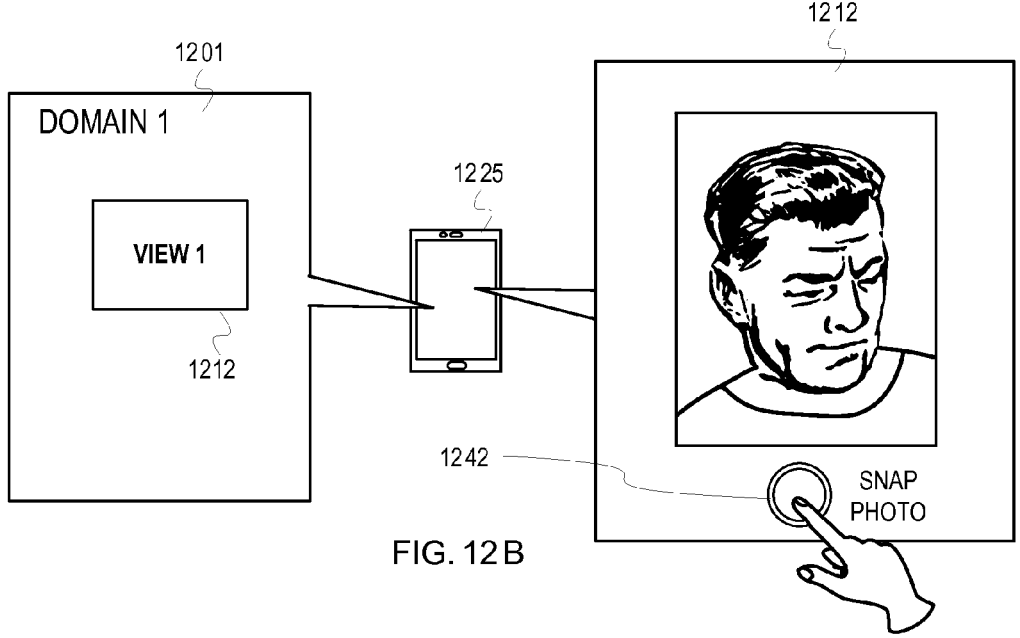
FIG. 12B is an example illustration of using a first application associated with a first OS domain.
Figure 12C:
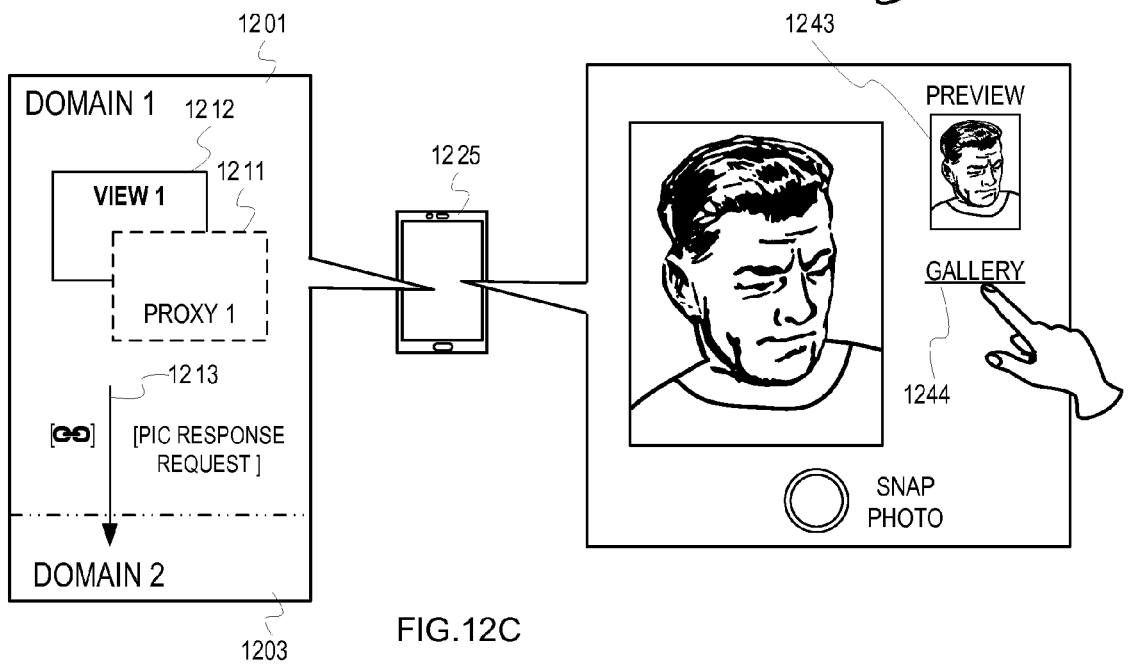
FIG. 12C is an example illustration of detecting an activity of a first application that is related to a second application associated with a second OS domain.

FIG. 11 is an example flow diagram ("flow") 1100 illustrating presenting cross domain tasks. FIGS. 13A, 13B, 14A and 14B are conceptual diagrams that help illustrate the flow of FIG. 11, according to some embodiments. This description will present FIG. 11 in concert with FIGS. 13A, 13B, 14A and 14B. In some embodiments, the operations shown in FIG. 11 can be performed in series, while in other embodiments, one or more of the operations can be performed in parallel. For example, blocks 1102 and 1108 can be performed in parallel. Furthermore, the flow 1100 can be performed in parallel with the flows described in FIGS. 15A and 15B.

Figure 13A:
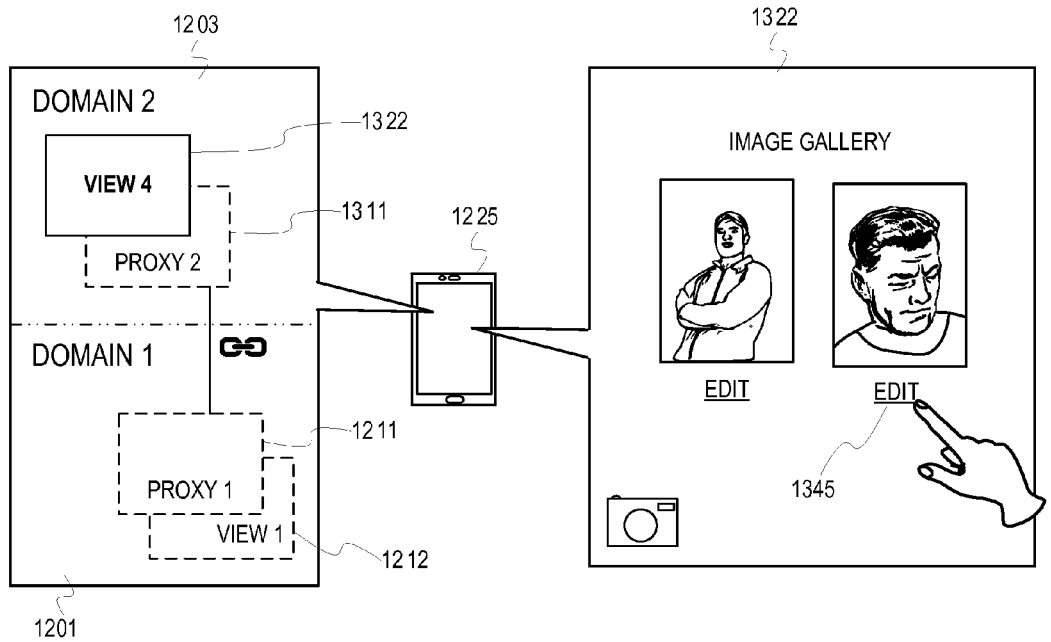
FIG. 13A is an example illustration of detecting performance of an activity of a second application that is associated with a second OS domain.
Figure 13B:
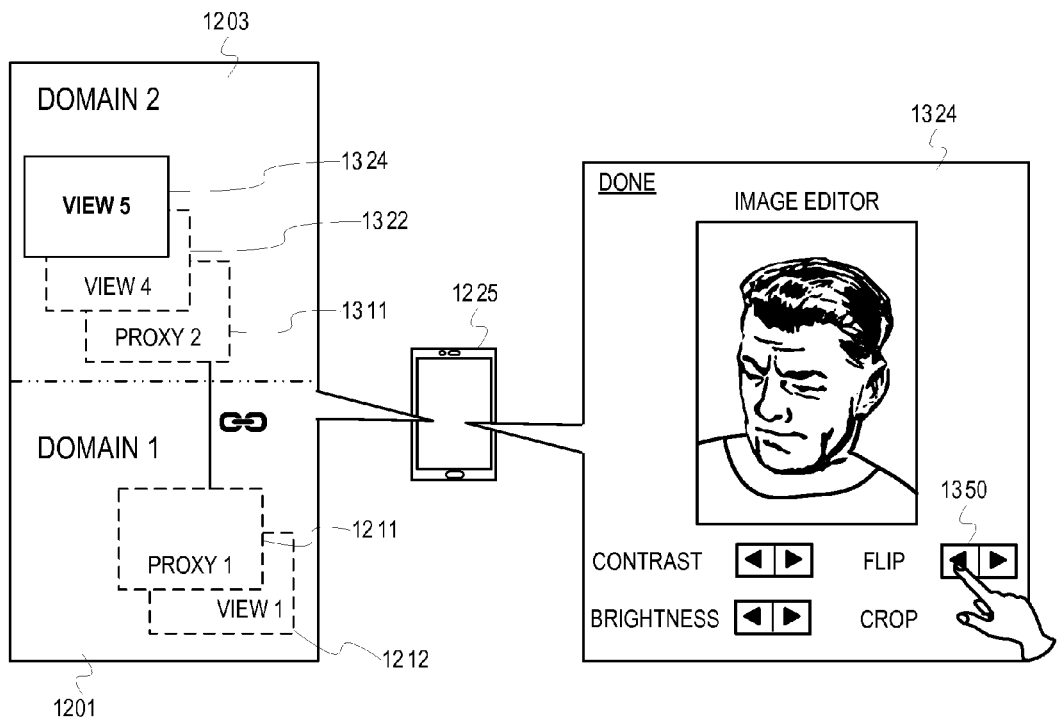
FIG. 13B is an example illustration of detecting a response value for an activity of a second application that is associated with a second OS domain.
Figure 14A:
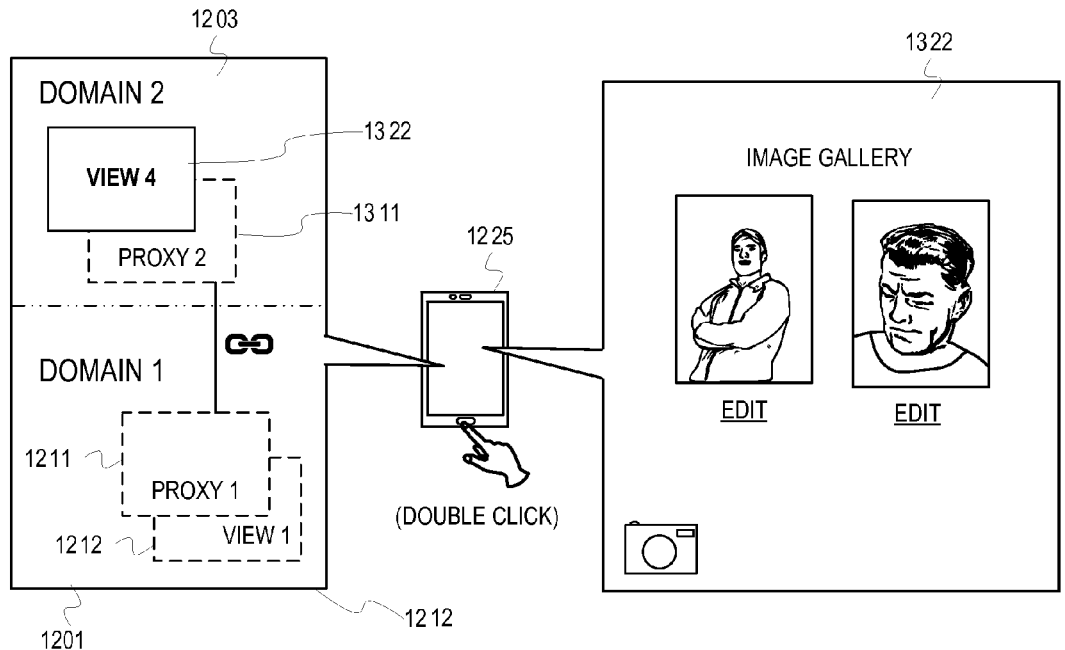
FIG. 14A is an example illustration of receiving user input via a device.
Figure 14B:
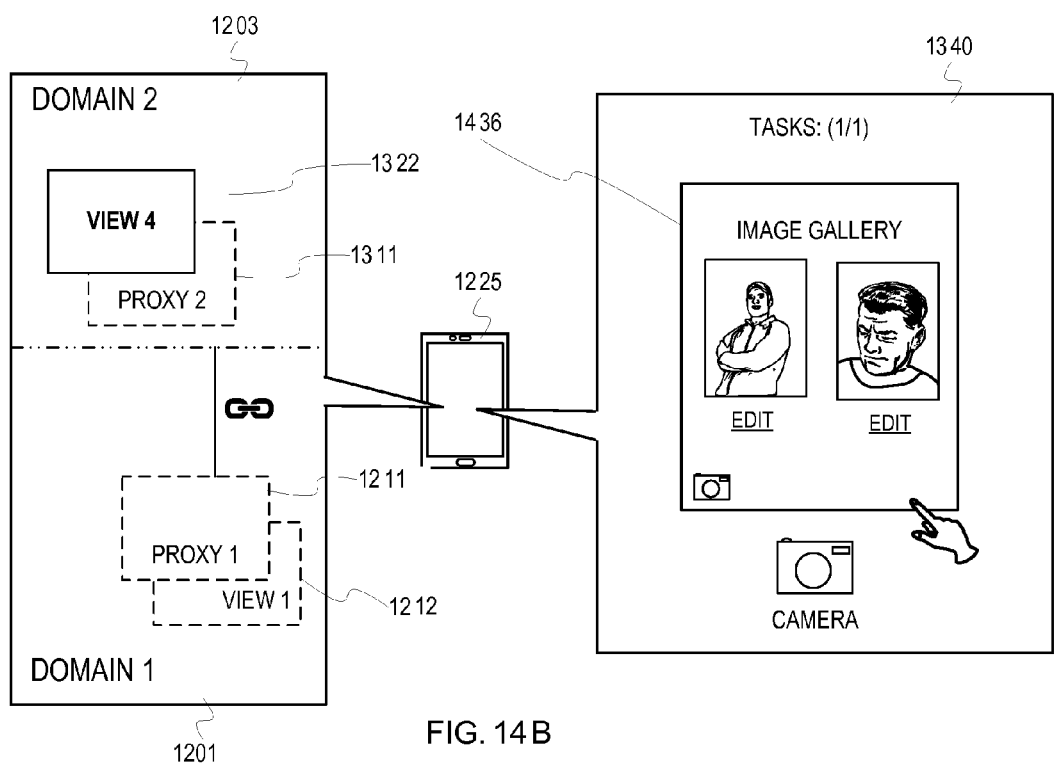
FIG. 14B is an example illustration of presenting a task list for a cross domain task for multiple OS domains.
Figure 16A:
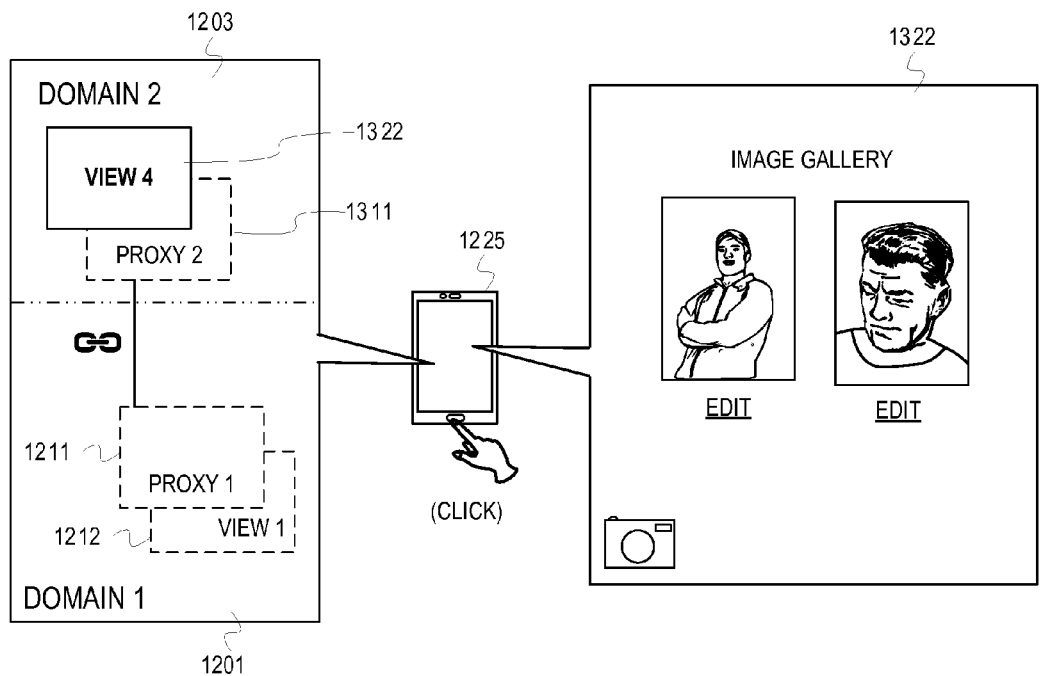
FIG. 16A is an example illustration of detecting a user input that initiates an operation for a back-stack feature for a cross domain task.
Figure 16B:
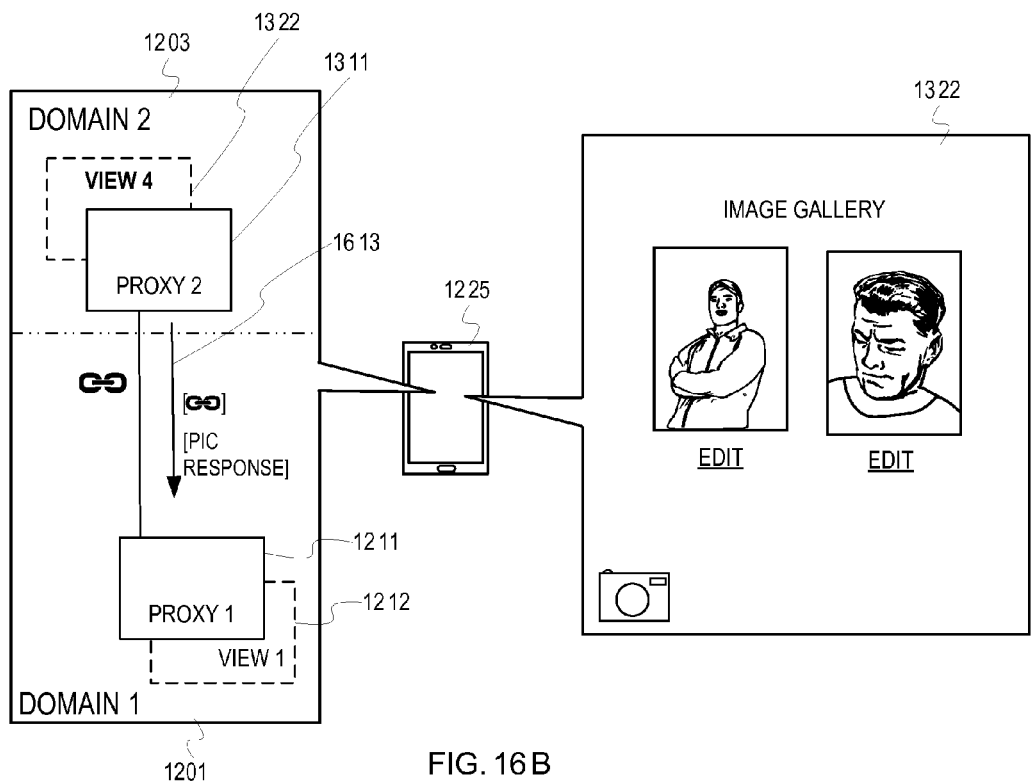
FIG. 16B is an example illustration of providing a response value to a first OS domain to revise a presentation of an activity view in the first OS domain that is associated with a cross-domain task.

In FIG. 11, the flow 1100 begins at block 1102, where a device determines whether an additional view is activated for a cross domain task. If so, then the flow 1000 continues at block 1104 where the device presents the additional activity view. For example, in FIG. 13A, the device 1225 detects a selection of an edit feature 1345 to edit the last picture taken from the camera application. Once selected, an additional activity view 1324 is presented as illustrated in FIG. 13B.

Referring back to FIG. 11, the flow 1100 continues at block 1106, where the device includes the additional activity view in a view stack for the cross domain task in the respective domain where the view additional activity view is activated. For example, in FIG. 13B the additional activity view 1324 is positioned at the top of the view stack (e.g., at a front of a back stack queue for the second OS domain 1203). Furthermore, in FIG. 13B, the additional activity view 1324 provides features to edit the last picture taken. For example, one of the features is a control 1350 used to flip the picture horizontally. After editing the picture (e.g., after flipping the picture horizontally), the additional activity view 1324 is closed and the second OS domain 1203 removes the additional activity view 1324 from the view stack, causing the second activity view 1322 to be displayed again.

Referring back to FIG. 11, the flow 1100 continues at block 1108, where the device determines whether a task list feature is selected. If so, then the process continues at block 1110 wherein the device determines that the first proxy link is associated with the second proxy link. For example, in FIG. 14A, after the second activity view 1322 is presented again, the device 1225 receives an additional user input (e.g., a double-click of a navigation button on the device 1225).

Referring back to FIG. 11, the flow 1100 continues at block 1112, where the device presents the second activity view in a task list. The device also prevents the first activity view from being presented as a separate task in the task list. For example, in FIG. 14B, in response to the additional user input described in FIG. 14A, the device 1225 presents in a task list 1340, a thumbnail image 1436 of the second activity view 1322. The device 1225 can present the task list 1340 as similarly described in FIG. 9. The thumbnail image 1436 represents the cross domain task in that it only shows a representation of the second activity view 1322 (at the top of the view stack for the cross domain task) and not a representation of the first activity view 1212 (which is below the second activity view 1322 in the view stack for the cross domain stack). If the thumbnail image 1436 is selected from the task list 1340, then the display returns to the most recently accessed view for that task, which was the second activity view 1322.

FIG. 15A is an example flow diagram ("flow") 1500 illustrating managing cross domain tasks. FIG. 15B is an example flow diagram ("flow") 1501 illustrating managing cross domain tasks. FIGS. 16A, 16B, 17A and 17B are conceptual diagrams that help illustrate the flow of FIGS. 15A and 15B, according to some embodiments. This description will present FIGS. 15A and 15B in concert with FIGS. 16A, 16B, 17A and 17B.

In FIG. 15A, the flow 1500 begins at block 1502, where a device detects user input via a second activity view to terminate the second activity view. For example, in FIG. 16A, the device 1225 receives an additional user input (e.g., a single click of the navigation button on the device 1225 or a selection of a graphical "back" button), which initiates a request to close the second activity view 1322 and present the next lowest view for the cross domain task.

Referring back to FIG. 15A, the flow 1500 continues at block 1504, where the device brings the second proxy link to a foreground of a display of the device. For example, in FIG. 16B, after detecting the additional user input (e.g., the single click of the navigation button or the selection of the graphical "back" button), the second proxy link 1311 comes to the foreground of a display of the device 1225.

Referring back to FIG. 15A, the flow 1500 continues at block 1506, where the device instructs the first proxy link to come to foreground of the display. The device further passes the response value to the first application. For example, in FIG. 16B, the second proxy link 1311 detects that it is coming to the foreground and initiates a message 1613 to be sent to the first OS domain 1201. The message 1613 includes a request for whichever proxy link is associated with the token to come to the foreground. The message 1613 includes a copy of the token to pass to the first OS domain 1201. Furthermore, the second OS domain 1203 also includes in the message 1613 a response value associated with the activity or activities for the second activity view 1322 that were requested by the first application 1210. For example, as described previously in FIG. 12C, the camera application requested, in the message 1213, that the gallery application return a value for the last picture taken so that it could present it as the preview image 1243. Therefore, in FIG. 16B, the message 1613 includes data pertaining to the requested response value. For example, the message 1613 may include a copy of the edited image which was modified (e.g., flipped horizontally) as described in FIG. 13B. The first OS domain 1201 receives the message 1613 and, based on the token included in the message 1613, determines that the first proxy link 1211 is associated with the token. The first OS domain 1201 then instructs the first proxy link 1211 to come to the foreground.

Referring back to FIG. 15A, the flow 1500 continues at block 1508, where the device closes the second application and the second activity view, and deletes the second proxy link. For example, in FIG. 17A, after the second proxy link 1311 initiated the message 1631 and instructed the second activity view 1322 to close, the second proxy link 1311 deletes itself. For instance, in the example described in FIG. 8, if the second proxy link 811 were to delete itself, it would instruct the second application launcher 662 to delete the second task ID 860, and the second proxy reference 861 associated with the second proxy link 811 Referfing back to FIG. 17A, the second OS domain 1203 then transfers the focus for the display of the device 1225 back to the first OS domain 1201.

Referring now to FIG. 15B, the flow 1501 begins at block 1512, where the device detects the instruction to bring the first proxy link to the foreground. For example, in FIG. 17A, the first OS domain 1201 receives the token from the message 1613 and determines that the token is associated with the first proxy link 1211. For example, referring to FIG. 8, if the proxy manager 633 were to receive a message to bring the first proxy link 711 to the foreground, the proxy manager 633 would look up the token 721 in the record 702 and determine that it is associated with the first proxy link 711 because of the identifier 761 in the record 702.

Figure 17:
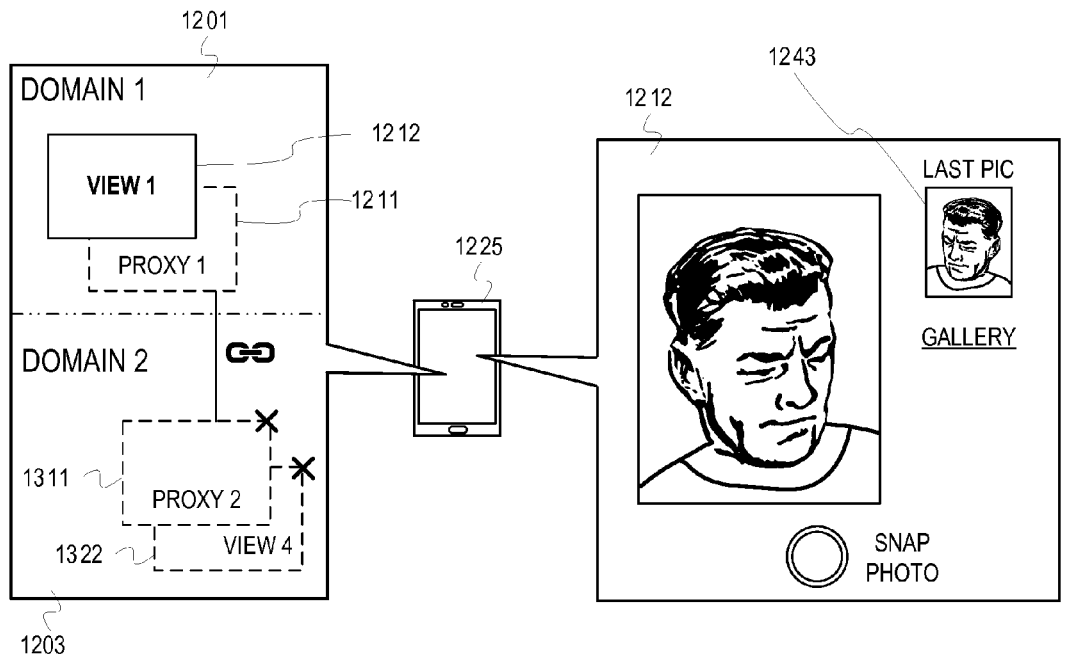
FIG. 17A is an example illustration of using a response value to revise presentation of an activity view in a first OS domain that is associated with a cross-domain task.
FIG. 17B is an example illustration of terminating a cross-domain task.
Figure 17:
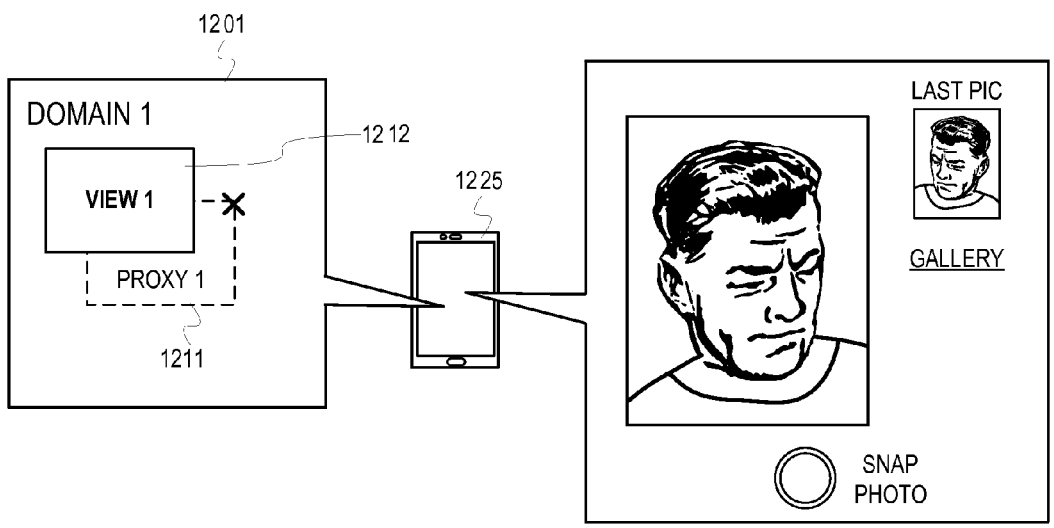

Referring back to FIG. 15B, the flow 1501 continues at block 1514, where the device brings first proxy link to foreground. For example, in FIG. 17A, after the first OS domain 1201 receives the message 1613, it instructs the first proxy link 1211 to come to the foreground. As the first proxy link 1211 comes to the foreground, it does not become visible. Rather, the first proxy link 1211 initiates an instruction for the first activity view 1212 to come to the foreground. As depicted in FIG. 17A, the first activity view 1212 is now in the foreground at the top of the view stack.

Referring back to FIG. 15B, the flow 1501 continues at block 1516, where the device presents the first activity view as the active view using the response value. For example, in FIG. 17A, the device 1225 presents the first activity view 1212. The first activity view 1212 shows the preview image 1243 using the copy of the picture as modified in FIG. 13B. Further, the first OS domain 1201 receives the message sent by the second OS domain 1203 to make the device 1225 switch focus to the first OS domain 1201. The focus returns to the first OS domain 1201. Because the first activity view 1212 is in the foreground, the first activity view 1212 becomes visible on the display of the device 1225.

Referring back to FIG. 15B, the flow 1501 continues at block 1518, where the device deletes the first proxy link. For example, in FIG. 17B, the first proxy link 1211 deletes itself. In the example shown in FIG. 8, the first proxy link 711 may instruct the proxy manager 633 to delete the record 702 because first proxy link 711 would no longer be associated with a cross domain task.

In some embodiments, the operations shown in FIGS. 15A and 15B can be performed in series, while in other embodiments, one or more of the operations can be performed in parallel. For example, block 1508 may be performed in parallel with any of the blocks 1512-1518.

In some embodiments, an operating system may be configured such that an activity view will not accept an instruction to be grouped under a same task identifier. For instance, after a first OS domain sends an instruction to generate a second proxy link, the second proxy link may attempt to invoke a second application in a second OS domain. However, the activity which invokes the second application may be configured (e.g., defined or declared) so that it will not accept the instruction to be grouped with the second proxy link in a cross domain task. The activity may force the second application to be given a new, separate task in the second OS domain. In such a case, the second proxy link will be created, but not associated with a second activity view for the second application. In such an example, the second proxy link can be configured to destroy itself and send an instruction to the first proxy link to destroy itself. The first proxy link will then destroy itself. The first activity view in the first OS domain will be the last activity view for the task before the first proxy link was created. If a task list were to be activated, there would be two separate tasks listed, one for the first application in the first OS domain, and one for the second application in the second OS domain.

Furthermore, in some embodiments, any of the domains may include a feature for a task (specifically, the process making up the task) to be terminated while the task is not in the foreground and memory is running low. The process is reinitiated when the task comes to foreground. For example, if a cross domain task is not in the foreground in either a first OS domain or a second OS domain, then the first OS domain and the second OS domain may be configured to independently terminate the processes for their portions of the cross domain task. Any of the individual processes on the respective domains can be reinitiated when the portion of that task is brought to the foreground in that domain.

While the operations of the example flow diagrams are shown in a particular order to help understand the disclosure, embodiments are not necessarily limited to the illustrated orders. Embodiments can perform the operations in a different order, at least some of the operations in parallel, different operations, etc. For example, operations of blocks 1102 and 1108 can be performed in parallel. Furthermore, the flow 1100 can be performed in parallel with the flows described in FIGS. 15A and 15B. Furthermore, operations for the block 1508 may be performed in parallel with, or after, any operations of blocks 1512, 1514, 1516, and 1518.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 18:
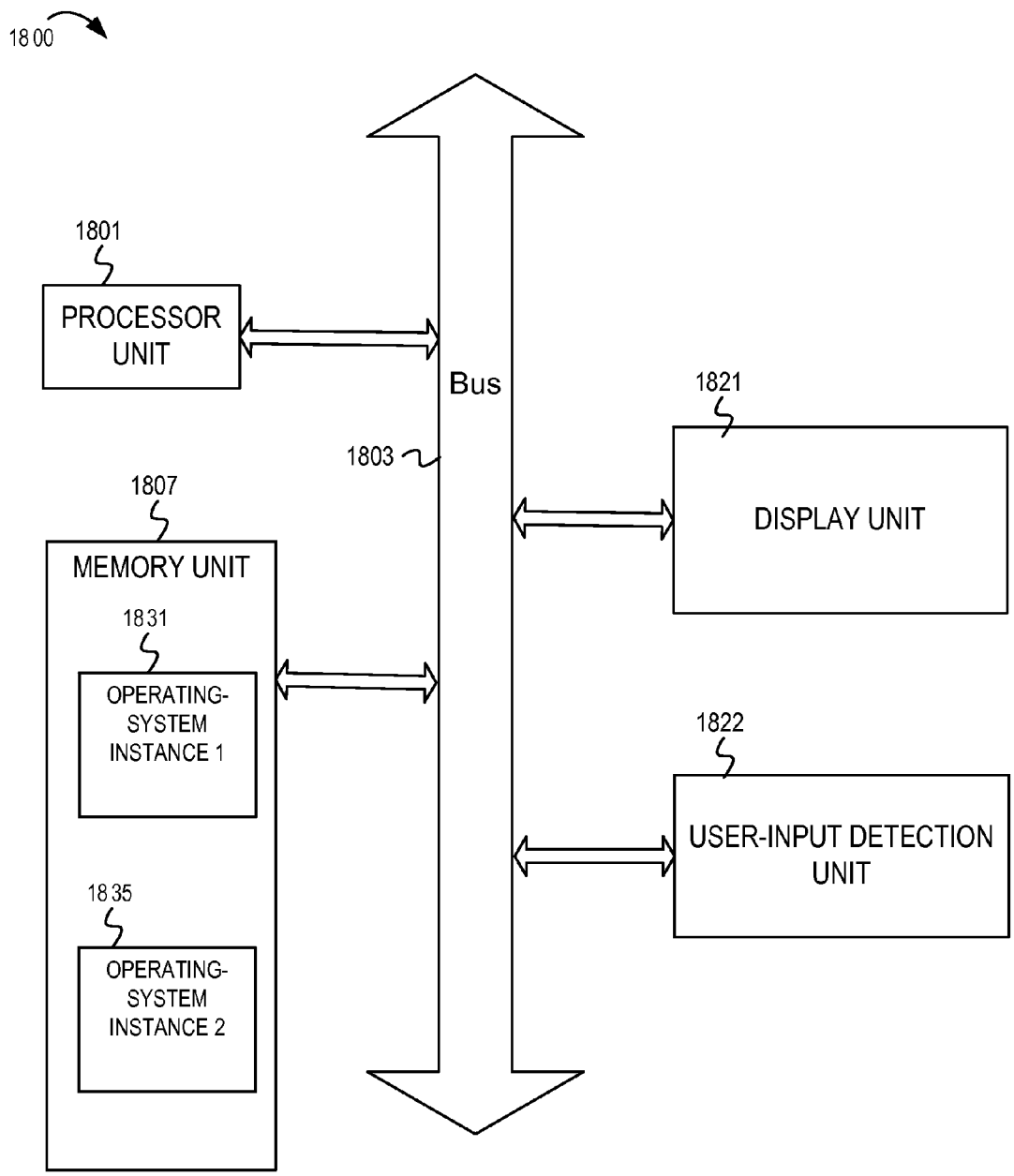
FIG. 18 is an illustration of an example device.

FIG. 18 depicts an example device 1800. The device 1800 includes a processor unit 1801 (possibly including multiple processors, multiple cores, multiple nodes, and/or implementing multi-threading, etc.). The device 1800 includes memory 1807. The memory 1807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The device 1800 also includes a bus 1803 (e.g., PCI, ISA, PCI-Express, HyperTransport® bus, InfiniBand® bus, NuBus, etc.). The memory 1807 embodies functionality to implement embodiments described above. The memory 1807 may include one or more functionalities that facilitate managing tasks. Any one of these functionalities may be partially (or entirely) implemented in hardware and/or on the processor unit 1801. For example, the functionality may be implemented with an application specific integrated circuit, in logic implemented in the processor unit 1801, in a co-processor on a peripheral device or card, etc. Further, realizations may include fewer or additional components not illustrated in FIG. 18 (e.g., video cards, audio cards, additional network interfaces, peripheral devices, etc.). The processor unit 1801, the storage device(s) 1809, and the network interface 1805 are coupled to the bus 1803. Although illustrated as being coupled to the bus 1803, the memory 1807 may be coupled to the processor unit 1801.

In some embodiments, the memory 1807 may include separate instances of an operating system, such as a first operating system instance 1831 and a second operating system instance 1835. The first operating system instance 1831 may include any of the components described herein that are associated with a first OS domain. The second operating system instance 1835 may include any of the components described herein that are associated with a second OS domain. Furthermore, the device 1800 includes a display unit 1821, such as touchscreen display, a retina display, an autostereoscopic 3D display, etc. The first operating system instance 1831 and the second operating system instance 1835 are configured to present views via the display unit 1821 for tasks, such as a for a cross domain task. Further, the device 1800 includes user-input detection unit 1822, configured to detect activation of user-input devices that are built into the device (e.g., a touchscreen, a "back" button, a navigation button, a volume button, biometric reading devices, eye-tracking devices, etc.). The display unit 1821 can also be configured to receive user input.

While the embodiments are described with reference to various implementations and exploitations, it will be understood that these embodiments are illustrative and that the scope of the inventive subject matter is not limited to them. In general, techniques for managing tasks, particularly cross domain tasks, as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   executing a first application within a first operating system domain of a device, the first application associated with at least a first activity view;
   detecting user input associated with the first application, wherein the user input activates a second activity view of a second application;
   responsive to determining that the second application corresponds to a second operating system domain of the device, generating a first proxy link within the first operating system domain;
   sending a message to the second operating system domain to generate a second proxy link after generating the first proxy link; and
   establishing a link between the first proxy link within the first operating system domain and the second proxy link within the second operating system domain, the first proxy link associated with causing the second proxy link to invoke the second activity view of the second application within the second operating system domain.

2. The method of claim 1, wherein the determining that the second application corresponds to the second operating system domain of the device comprises determining, from an application list stored in the first operating system domain, that the second application is associated with the second operating system domain and not with the first operating system domain.

3. The method of claim 1, wherein the method comprises:
   storing an identifier in the first operating system domain for the first proxy link;
   sending the identifier to the second operating system domain to generate the second proxy link; and
   causing the second operating system domain to generate the second proxy link responsive to the sending the identifier.

4. The method of claim 3, wherein the storing the identifier in the first operating system domain comprises:
   storing the identifier in a database record within the first operating system domain, wherein the database record further includes a reference to an object for the first proxy link, wherein the object for the first proxy link is associated with the first activity view.

5. The method of claim 3, wherein causing the second operating system domain to generate the second proxy link comprises:
   generating, via the second operating system domain, the second proxy link using the identifier; and
   storing, via the second operating system domain, the identifier within the second proxy link in the second operating system domain.

6. The method of claim 3 further comprising:
   using, via the second operating system domain, the identifier for communications with the first operating system domain that pertain to the second proxy link.

7. The method of claim 1 further comprising:
   using the first proxy link within the first operating system domain to represent the second activity view of the second application within the second operating system domain.

8. The method of claim 7, wherein the using the first proxy link within the first operating system domain to represent the second activity view of the second application within the second operating system domain comprises:
   determining, via the first proxy link, that the second proxy link indicates that the second activity view terminates within the second operating system domain;
   causing the first proxy link to activate responsive to the determining, via the first proxy link, that the second proxy link indicates that the second activity view terminated within the second operating system domain; and
   causing the first activity view to be displayed via a display of the device responsive to the causing the first proxy link to activate.

9. The method of claim 8, wherein the determining, via the first proxy link, that the second proxy link indicates that the second activity view terminates within the second operating system domain comprises:
   detecting that a communication generated via the second operating system domain identifies the first proxy link, wherein the communication is responsive to additional user input associated with the second application, wherein the additional user input is associated with activating the first activity view of the first application.

10. The method of claim 7, wherein the using the first proxy link within the first operating system domain to represent the second activity view of the second application within the second operating system domain comprises:
   launching a task switcher responsive to additional user input received via the device, wherein the task switcher is configured to present a representation of tasks that are running on the device;
   determining that the first proxy link was established with the second proxy link responsive to the launching the task switcher; and
   presenting, via the task switcher, a representation of the second activity view responsive to the determining that the first proxy link was established with the second proxy link.

11. The method of claim 10 further comprising:
   preventing presentation of a representation of the first activity view responsive to determining that the first proxy link was established with the second proxy link.

12. A device comprising:
   one or more processors; and
   one or more memory units configured to store instructions, which when executed by at least one of the one or more processors, cause the device to;
      execute a first application within a first operating system domain of the device, the first application associated with at least a first activity view,
      detect user input associated with the first application, wherein the user input is associated with activating a second activity view of a second application,
      determine that the second application corresponds to a second operating system domain of the device,
      generate a first proxy link within the first operating system domain in response to determining that the second application corresponds to the second operating system domain,
      send a message to the second operating system domain to generate a second proxy link after generating the first proxy link, and
      establish a link between the first proxy link within the first operating system domain and the second proxy link within the second operating system domain, the first proxy link configured to cause the second proxy link to invoke the second activity view of the second application within the second operating system domain.

13. The device of claim 12, wherein the one or more memory units configured to store the instructions to determine that the second application corresponds to the second operating system domain of the device is configured to store instructions, which when executed by at least one of the one or more processors, cause the device to determine, from an application list stored in the first operating system domain, that the second application is assigned to the second operating system domain and not to the first operating system domain.

14. The device of claim 12, wherein the one or more memory units configured to store the instructions to establish the first proxy link within the first operating system domain that corresponds with the second proxy link within the second operating system domain is configured to store instructions, which when executed by at least one of the one or more processors, cause the device to:
   store an identifier in the first operating system domain for the first proxy link;
   use the identifier to generate the second proxy link in the second operating system domain; and
   store the identifier in the second operating system domain for the second proxy link.

15. The device of claim 12, wherein the one or more memory units are configured to store instructions, which when executed by at least one of the one or more processors, further cause the device to:
   use the first proxy link within the first operating system domain to represent the second activity view of the second application within the second operating system domain.

16. The device of claim 15, wherein the one or more memory units configured to store the instructions to use the first proxy link within the first operating system domain to represent the second activity view of the second application within the second operating system domain is configured to store instructions, which when executed by at least one of the one or more processors, further cause the device to:
   determine that the second proxy link indicates that the second activity view terminates within the second operating system domain;
   activate the first proxy link responsive to determining that the second proxy link indicated that the second activity view terminated; and
   present the first activity view via a display of the device responsive to the first proxy link being activated.

17. The device of claim 15, wherein the one or more memory units configured to store the instructions to use the first proxy link within the first operating system domain to represent the second activity view of the second application within the second operating system domain is configured to store instructions, which when executed by at least one of the one or more processors, further cause the device to:
   launch a task switcher responsive to additional user input received via the device, wherein the task switcher is configured to present a representation of tasks that are running on the device;
   determine that the first proxy link was established with the second proxy link responsive to the task switcher being launched; and
   present, via the task switcher, a representation of the second activity view responsive to determination that the first proxy link was established with the second proxy link.

18. One or more non-transitory computer-readable storage media having instructions stored thereon, which when executed by a set of one or more processors causes the set of one or more processors to perform operations comprising:
   executing a first application within a first operating system domain of a device, the first application associated with at least a first activity view;
   detecting user input associated with the first application, wherein the user input is associated with activating a second activity view of a second application;
   responsive to determining that the second application corresponds to a second operating system domain of the device, generating a first proxy link within the first operating system domain;
   sending a message to the second operating system domain to generate a second proxy link after generating the first proxy link; and
   establishing a link between the first proxy link within the first operating system domain and the second proxy in within the second operating system domain, the first proxy link associated with causing the second proxy link to invoke the second activity view of the second application within the second operating system domain.

19. The one or more non-transitory computer-readable storage media of claim 18, wherein the operation of determining that the second application corresponds to the second operating system domain of the device includes operations comprising determining, from an application list stored in the first operating system domain, that an entry in the list associated with the second application indicates that the second application is assigned to the second operating system domain.

20. The one or more non-transitory computer-readable storage media of claim 18, wherein the operation of establishing the first proxy link within the first operating system domain that corresponds with the second proxy link within the second operating system domain includes operations comprising:
storing an identifier in the first operating system domain for the first proxy link;
sending the identifier to the second operating system domain to generate the second proxy link using the identifier; and
causing the second operating system domain to generate the second proxy link and store the identifier in the second operating system domain for the second proxy link responsive to the sending the identifier.

21. The one or more non-transitory computer-readable storage media of claim 18, said operations further comprising:
using the first proxy link within the first operating system domain to represent the second activity view of the second application within the second operating system domain.

22. The one or more non-transitory computer-readable storage media of claim 21, wherein the operation of using the first proxy link within the first operating system domain to represent the second activity view of the second application within the second operating system domain includes operations comprising:
determining, via the first proxy link, that the second proxy link indicates that the second activity view terminates within the second operating system domain;
causing the first proxy link to activate responsive to determining that the second proxy link indicated that the second activity view terminated within the second operating system domain; and
causing the first activity view to be displayed via a display of the device responsive to causing the first proxy link to activate.

23. The one or more non-transitory computer-readable storage media of claim 21, wherein the operation of using the first proxy link within the first operating system domain to represent the second activity view of the second application within the second operating system domain includes operations comprising:
launching a task switcher responsive to additional user input received via the device, wherein the task switcher is configured to present a representation of tasks that are running on the device;
determining that the first proxy link was established with the second proxy link responsive to the launching the task switcher; and
presenting, via the task switcher, representation of the second activity view responsive to determining that the first proxy link was established with the second proxy link.

24. A method comprising:
determining that an input, to a first application in a first operating system domain, indicates an activity view of a second application in a second operating system domain;
associating a first proxy within the first operating system domain with a second proxy within the second operating system domain after determining that the input indicates the activity view of the second application;
indicating the activity view of the second application to the second proxy using the first proxy;
causing, by the second proxy responsive to the first proxy indicating the activity view of the second application to the second proxy, cohesive presentation of the activity view of the second application within the second operating system domain with respect to an activity view of the first application in the first operating system domain; and
causing, by the first proxy responsive to the second proxy indicating that the activity view of the second application terminated within the second operating system domain, presentation of the activity view of the first application.

25. The method of claim 24, wherein the causing the cohesive presentation of the activity view of the second application with respect to the activity view of the first application comprises causing presentation of the activity view of the second application as if it originated from the first application.

26. The method of claim 24, wherein the causing the cohesive presentation of the activity view of the second application with respect to the activity view of the first application comprises presenting a copy of the activity view of the second application via an application task list and preventing presentation of a copy of the activity view of the first application via the task list until the second proxy indicates to the first proxy that the activity view of the second application has terminated.

27. A method comprising:
launching a task switcher in response to receiving an input associated with presenting a task list on an electronic device, wherein the task switcher is configured to present a representation of tasks that are running on the electronic device;
determining that a first task comprises at least a first activity view in a first operating system domain of the electronic device and a second activity view in a second operating system domain of the electronic device;
establishing a first proxy within the first operating system domain that corresponds with a second proxy within the second operating system domain; and
presenting the task list including a single representation of the first task that is based at least in part on one of the first activity view or the second activity view, wherein the task list is presented by the task switcher responsive to determining that the first proxy was established with the second proxy.

28. The method of claim 27, further comprising preventing presentation of another representation of the first task that is based on the other one of the first activity view or the second activity view.

29. The method of claim 27, further comprising determining that the at least the first activity view in the first operating system is linked to the second activity view in the second operating system domain based at least in part on a proxy link between the first activity view and the second activity view.

30. The method of claim 27 further comprising:
associating, in the first operating system domain, a first identifier for the first task with a first activity view identifier for the first activity view and with a proxy identifier of a proxy link between the first activity view and the second activity view; and
associating, in the second operating system domain, a second identifier for the first task with a second activity view identifier for the second activity and with the proxy identifier.

* * * * *